United States Patent
Daly et al.

(10) Patent No.: US 9,394,375 B2
(45) Date of Patent: Jul. 19, 2016

(54) COMPOSITIONS CONTAINING RECYCLABLE IONIC LIQUIDS FOR USE IN BIOMASS PROCESSING

(75) Inventors: Daniel T. Daly, Tuscaloosa, AL (US); Robin D. Rogers, Tuscaloosa, AL (US); Ying Qin, Tuscaloosa, AL (US)

(73) Assignee: Board of Trustees of the University of Alabama, Tuscaloosa, AL (US)

( * ) Notice: Subject to any disclaimer, the term of this patent is extended or adjusted under 35 U.S.C. 154(b) by 450 days.

(21) Appl. No.: 13/428,786

(22) Filed: Mar. 23, 2012

(65) Prior Publication Data

US 2012/0245336 A1 Sep. 27, 2012

Related U.S. Application Data

(60) Provisional application No. 61/467,612, filed on Mar. 25, 2011.

(51) Int. Cl.
| | |
|---|---|
| *C08B 1/00* | (2006.01) |
| *C08B 37/08* | (2006.01) |
| *C08B 37/00* | (2006.01) |
| *B01D 21/01* | (2006.01) |
| *C02F 1/52* | (2006.01) |
| *C08H 8/00* | (2010.01) |
| C08B 15/06 | (2006.01) |
| D21C 9/00 | (2006.01) |
| C13K 1/02 | (2006.01) |
| C13K 1/06 | (2006.01) |
| B01D 21/00 | (2006.01) |
| C02F 1/00 | (2006.01) |

(52) U.S. Cl.
CPC ............... *C08B 1/00* (2013.01); *C08B 37/0003* (2013.01); *C08B 37/003* (2013.01); *C08H 8/00* (2013.01)

(58) Field of Classification Search
CPC ...... C08B 1/00; C08B 1/003; C08B 37/0003; C08B 37/14; C08B 30/04; B01J 19/06; C10L 7/02; Y02E 50/16
See application file for complete search history.

(56) References Cited

U.S. PATENT DOCUMENTS

| | | | |
|---|---|---|---|
| 1,943,176 | A | 1/1934 | Graenacher |
| 4,063,017 | A | 12/1977 | Tsao et al. |
| 4,097,666 | A | 6/1978 | Johnson et al. |
| 4,188,263 | A | 2/1980 | Hulsmann et al. |
| 4,520,105 | A | 5/1985 | Sinner et al. |

(Continued)

FOREIGN PATENT DOCUMENTS

| | | |
|---|---|---|
| CA | 2479941 | 10/2003 |
| CH | 153446 | 6/1932 |

(Continued)

OTHER PUBLICATIONS

Office Action for U.S. Appl. No. 12/735,827 dated Feb. 6, 2013.

(Continued)

*Primary Examiner* — Nam Nguyen
*Assistant Examiner* — Clare Perrin
(74) *Attorney, Agent, or Firm* — Meunier Carlin & Curfman LLC

(57) ABSTRACT

Compositions containing biomass, an ionic liquid, and an amide are described herein. Methods of their preparation and use in extracting and processing biomass are also described herein. Further described herein are films and fibers prepared from the compositions. Methods of recovering the ionic liquids used to process the biomass are also provided.

31 Claims, 10 Drawing Sheets

(56) References Cited

U.S. PATENT DOCUMENTS

| | | | |
|---|---|---|---|
| 4,522,934 A | 6/1985 | Shum et al. | |
| 4,970,156 A | 11/1990 | Avrameas et al. | |
| 5,077,414 A | 12/1991 | Arduengo, III | |
| 5,679,146 A | 10/1997 | Kalt et al. | |
| 5,683,832 A | 11/1997 | Bonhote et al. | |
| 5,714,536 A | 2/1998 | Ziolo et al. | |
| 5,747,125 A | 5/1998 | Markulin | |
| 5,792,399 A | 8/1998 | Meister et al. | |
| 5,827,602 A | 10/1998 | Koch et al. | |
| 5,856,513 A | 1/1999 | Ue et al. | |
| 6,376,712 B2 | 4/2002 | Narizuka et al. | |
| 6,451,220 B1 | 9/2002 | Ziolo et al. | |
| 6,613,310 B1 | 9/2003 | Campbell et al. | |
| 6,808,557 B2 | 10/2004 | Holbrey et al. | |
| 6,824,599 B2 | 11/2004 | Swatloski et al. | |
| 7,198,695 B2 | 4/2007 | Kettenbach et al. | |
| 7,253,289 B2 | 8/2007 | Ren et al. | |
| 7,550,520 B2 | 6/2009 | Daly et al. | |
| 8,030,030 B2 | 10/2011 | Varanasi et al. | |
| 8,038,840 B2 | 10/2011 | Li | |
| 8,044,120 B2 | 10/2011 | D'Andola et al. | |
| 8,110,667 B2 | 2/2012 | Zhang et al. | |
| 8,182,557 B2 | 5/2012 | Argyropoulos | |
| 2002/0010291 A1 | 1/2002 | Murphy | |
| 2003/0059604 A1 | 3/2003 | Hattori et al. | |
| 2003/0157351 A1 | 8/2003 | Swatloski et al. | |
| 2003/0165445 A1 | 9/2003 | Malnou et al. | |
| 2003/0233742 A1 | 12/2003 | Jones et al. | |
| 2004/0038031 A1 | 2/2004 | Holbrey et al. | |
| 2004/0077519 A1 | 4/2004 | Price et al. | |
| 2005/0061457 A1 | 3/2005 | Skuratowicz | |
| 2005/0123851 A1 | 6/2005 | Shinbori et al. | |
| 2005/0194561 A1 | 9/2005 | Davis | |
| 2005/0196671 A1 | 9/2005 | Paonessa et al. | |
| 2005/0285073 A1 | 12/2005 | Singh et al. | |
| 2005/0288484 A1 | 12/2005 | Holbrey et al. | |
| 2006/0118755 A1 | 6/2006 | Fujioka et al. | |
| 2006/0128996 A1 | 6/2006 | Vaultier et al. | |
| 2006/0194197 A1 | 8/2006 | Spangler et al. | |
| 2006/0241287 A1 | 10/2006 | Hecht et al. | |
| 2007/0006774 A1 | 1/2007 | Rogers et al. | |
| 2007/0093462 A1 | 4/2007 | Rogers et al. | |
| 2007/0112185 A1 | 5/2007 | Myllymaki | |
| 2007/0161095 A1* | 7/2007 | Gurin | 435/134 |
| 2007/0215300 A1 | 9/2007 | Upfal et al. | |
| 2007/0225191 A1 | 9/2007 | Scheibel et al. | |
| 2008/0023162 A1 | 1/2008 | Myllymaki et al. | |
| 2008/0164440 A1* | 7/2008 | Maase et al. | 252/182.12 |
| 2008/0190013 A1 | 8/2008 | Argyropoulos | |
| 2008/0227162 A1 | 9/2008 | Varanasi et al. | |
| 2008/0241536 A1 | 10/2008 | Luo et al. | |
| 2009/0088564 A1 | 4/2009 | Luo et al. | |
| 2009/0221813 A1* | 9/2009 | Moellmann et al. | 536/85 |
| 2010/0081798 A1 | 4/2010 | Balensiefer et al. | |
| 2010/0112646 A1 | 5/2010 | Balensiefer et al. | |
| 2010/0170504 A1 | 7/2010 | Zhang | |
| 2010/0196967 A1 | 8/2010 | Edye et al. | |
| 2010/0249432 A1 | 9/2010 | Siemer et al. | |
| 2010/0287826 A1 | 11/2010 | Hoffman et al. | |
| 2010/0319862 A1 | 12/2010 | Rahman | |
| 2012/0115729 A1 | 5/2012 | Qin et al. | |
| 2012/0245336 A1 | 9/2012 | Daly et al. | |
| 2012/0291773 A1* | 11/2012 | O'Connor | 127/37 |

FOREIGN PATENT DOCUMENTS

| | | | |
|---|---|---|---|
| CN | 1380110 | 11/2002 | |
| EP | 0780391 | 6/1997 | |
| EP | 1222918 | 7/2002 | |
| EP | 1854786 | 11/2007 | |
| JP | 58183601 | 10/1983 | |
| JP | 63056501 | 3/1988 | |
| JP | 64017649 | 1/1989 | |
| JP | 80089796 | 4/1996 | |
| JP | 10265674 | 10/1998 | |
| JP | 2002290011 | 10/2002 | |
| JP | 2003171144 | 6/2003 | |
| JP | 2003335887 | 11/2003 | |
| WO | WO9420521 | 9/1994 | |
| WO | WO9521871 | 8/1995 | |
| WO | WO9606593 | 3/1996 | |
| WO | WO0032658 | 6/2000 | |
| WO | WO0181436 | 11/2001 | |
| WO | WO02079269 | 10/2002 | |
| WO | WO02100360 | 12/2002 | |
| WO | WO02102586 | 12/2002 | |
| WO | WO03029329 | 4/2003 | |
| WO | WO03041692 | 5/2003 | |
| WO | WO03074031 | 9/2003 | |
| WO | WO2004027897 | 4/2004 | |
| WO | WO2005017252 | 2/2005 | |
| WO | 2006097571 A1 | 9/2006 | |
| WO | WO2006116126 A2 | 11/2006 | |
| WO | WO 2006116126 A2 * | 11/2006 | B01D 11/02 |
| WO | WO2007005388 | 1/2007 | |
| WO | WO2007063327 | 6/2007 | |
| WO | WO 2007111605 A1 * | 10/2007 | D21F 11/00 |
| WO | WO2007111605 A1 | 10/2007 | |
| WO | WO 2008095252 A1 * | 8/2008 | C12P 7/10 |
| WO | WO2009105236 | 8/2009 | |
| WO | WO2010056790 | 5/2010 | |
| WO | 2012033973 A1 | 3/2012 | |

OTHER PUBLICATIONS

Huddleston et al., Room Temperature Ionic Liquids as Novel Media for 'Clean' Liquid-Liquid Extraction, Chem. Commun., 1765-1766 (1998).

Husemann et al., Homogeneous Acetylation of Cellulose, Buletinul Institutului Politehnic Din Lasi, 1(1-2):47-51 (1970) (abstract).

Illanes et al., Immobilization of Lactase and Invertase on Crosslinked Chitin, in Bioreactor Immobilized Enzymes and Cells, Moo-Young, Ed., Elsevier Applied Science: London, 233-249 (1998).

Illanes, Stability of Biocatalysts, Elec. J. Biotechnol., 2(1):1-9 (1999).

International Search Report and Written Opinion for Application No. PCT/US2010/055381 dated Aug. 2, 2011.

International Search Report and Written Opinion for PCT/US2009/64105 issued Jan. 13, 2010.

International Search Report and Written Opinion for PCT/US2009/01066 issued Jun. 22, 2009.

International Search Report and Written Opinion for PCT/US2006/020941 issued Feb. 27, 2008.

International Search Report and Written Opinion for PCT/US2005/010235 issued Jan. 3, 2007.

Kilpeläinen et al., Dissolution of wood in ionic liquids, J. Agric. Food Chem., 55:9142-9148 (2007).

Kirk-Othmer, Encyclopedia of Chemical Technology, 4 Ed., 5:476-563 (1993).

Krajewska, Application of Chitin- and Chitosan-based Materials for Enzyme Immobilizations: A Review, Enz. Microb. Techno., 35:126-139 (2004).

Lau et al., Dissolution of Candida Antarctica Lipase B in Ionic Liquids: Effects on Structure and Activity, Green Chem., 6:483-487 (2004).

Lee et al., Ionic Liquid-Mediated Selective Extraction of Lignin from wood leading to enhanced enzymatic cellulose hydrolysis, Biotech. and Bioeng., 102(5):1368-1376 (2009).

Leipner et al., Structural Changes of Cellulose Dissolved in Molten Salt Hydrates, Macromol Chem Phys, 201 (15):2041-2049 (2000).

Liebert et al., Tailored Cellulose Esters: Synthesis and Structure Determination, Biomacromolecules, 6:333-340 (2005).

Linko et al., Cellulose Bead Entrapped Microbial Cells Biotechnical Applications, Enzyme Microb. Technol., 1:26-30 (1979).

Ma et al., Reverse Atom Transfer Radical Polymerization of Methyl Methacrylate in Room-Temperature Ionic Liquids, J. Polymer Sci. Pt. A-Polymer Chem., 41:143-151 (2003).

Maia et al., Cellulose Organic Solvents. 1. The Structure of Anhydrous N-Methylmorpholine N-Oxide and N-Methylmorphline N-Oxide Monohydrate, Acta Cryst., B37:1858-1862 (1981).

(56) References Cited

OTHER PUBLICATIONS

Mais et al., Modification of Cellulose Using Cellulose p-Toluene-Sulfonates as Intermediates, Zeszyty Naukowe Politechniki Slaskiej Chemm., 140:121-125 (1999).
Manangeeswaran et al., Degradation of indulin, a kraft pine lignin, by Serratia marcescens, J. Environ. Sci. Health, Part B: Pesticides, Food Contaminants, and Agricultural Wastes, 42(3):321-327 (2007).
Marson et al., A Novel, Efficient Procedure for Acylation of Cellulose Under Homogeneous Solution Conditions, J. Appl. Polymer Sci., 74:1355-1360 (1999).
Mazurkiewicz et al., Conducting Polymer Electrochemistry in Ionic Liquids, Synthetic Metals, 135:31-32 (2003).
Nara et al., Lipase-Catalysed Polyester Synthesis in 1-Butyl-3-Methylimidazolium Hexafluorophosphate Ionic Liquid, Tetrahedron Lett., 44:1371-1373 (2003).
Ngo et al., Thermal Properties of Imidazolium Ionic Liquids, Thermochimica Acta, 357-358:97-102 (2000).
Ohno et al., A New Type of Polymer Gel Electrolyte: Zwitterionic Liquid/Polar Polymer Mixture, Electrochimica Acta, 48:2079-2083 (2003).
Okamato et al., Synthesis, Spectra, and Reactions of N-Triphenylmethylpyridinium Salts. Reactions of Triphenylmethyl Chlordie with Pyridine Under High Pressure, J. Org. Chem., 35(11):3752-3756 (1970).
Padhye et al., Cellulose Degradation in Xanthate Process, J. App. Polymer Sci., 36:1475-1478 (1988).
Perrier et al., Reversible Addition—Fragmentation Chain Transfer Polymerization of Methacrylate, Acrylate and Styrene Monomers in 1-Alkyl-3-Methylimidazolium Hexfluorophosphate, European Polymer J., 39(3):417-422 (2003).
Pu et al., Ionic liquid as a green solvent for lignin, J. Wood Chem. Technol, 27:23-33 (2007).
Ren et al., Synthesis of 1-Allyl-3-Methylimidazolium-Based Room Temperature Ionic Liquid and Preliminary Study of its Dissolving Cellulose, Acta Polymerica Sinica, 3:448-451 (2003) (abstract).
Rogers et al., Ionic Liquids—Solvents of the Future?, Science, 302:792-793 (2003).
Sakai, Determination of Pore Size and Pore Size Distribution, J. Membr. Sci., 96:91-130 (1994).
Shriver et al., Inorganic Chemistry, W. H. Freeman & Co., New York, pp. 405-407 (1990).
Snedden et al., Cross-Linked Polymer-Ionic Liquid Composite Materials, Macromolecules, 36(12):4549-4556 (2003).
Stöllner et al., Activation of Cellulose Membranes with 1,1'-Carbonyldiimidazole or 1-Cyano-4-Dimethylaminopyridinium Tetrafluoroborate as a Basis for the Development of Immunosensors, Anal. Biochem., 304:157-165 (2002).
Suarez et al., Synthesis and Physical-Chemical Properties of Ionic Liquids Based on 1-n-Butyl-3-Methylimidazolium Cation, J. Chim. Phys., 95:1626-1639 (1998).
Sun et al., Magnetite-Embedded Cellulose Fibers Prepared From Ionic Liquid, J. Mat. Chem., 18:283-290 (2008).
Supplemental Search Report for EP4757863 issued May 12, 2009.
Swatloski et al., Dissolution of Cellulose with Ionic Liquids, J. Am. Chem. Soc., 124:4974-4975 (2002).
Swatloski et al., Ionic Liquids for the Dissolution and Regeneration of Cellulose, in Molten Salts XIII: Proceedings of the International Symposium, Trulove, P.C., DeLong, H.C., Mantz, R.A., Stafford, G.R., Matsunaga, M., Eds., The Electrochemical Society: Pennington, NJ, 19:155-164 (2002).
Tiller et al., A Novel Efficient Enzyme-Immobilization Reaction on NH2 Polymers by Means of L-Ascorbic Acid, Biotechnol. Appl. Biochem., 30:155-162 (1999).
Turner et al., Production of Bioactive Cellulose Films Reconstituted from Ionic Liquids, Biomacromolecules, 5:1379-1384 (2004).
Turner, Immobilization of Biocatalysts Using Novel IL-Reconstituted Cellulosic Support Materials, presentation on Apr. 19, 2005.
Visser et al., Task Specific Ionic Liquids for the Extraction of Metal Ions from Aqueous Solutions, Chem. Commun., 135-136 (2001).

Weckstrom et al., Entrapment of Whole Cell Yeast β-Galactosidase in Precipated Cellulose Derivatives, Food Process Eng., vol. 2, Applied Science Publishers Ltd., pp. 148-151 (1979).
Wilkes et al., Air and Water Stable 1-Ethyl-3-methylimidazolium Based Ionic Liquids, J. Chem. Soc. Chem. Commun., 13:965-967 (1992).
Willauer et al., Investigation of aqueous biphasic systems for the separation of lignins from cellulose in paper pulping process, J. Chromatogr. B: Biomed. Sci. Applic., 743(1-2):127-135 (2000).
Wu et al., Homogeneous Acetylation of Cellulose in a New Ionic Liquid, Biomacromol., 5:266-268 (2004).
Armstrong et al., Structure and properties of high stability geminal dicationic ionic liquids, J. Amer. Chem. Soc., 127(2):593-604 (2005).
Black et al., The estimation of chitin and chitin nitrogen in crawfish waste and derived products, Analyst, 75:185-189 (1950).
Brugnerotto et al., An infrared investigation in relation with chitin and chitosan characerization, Polymer, 42:3569-3580 (2001).
Deng et al., Phase Diagram of [Amirn]Cl+Salt Aqueous Biphasic Systems and Its Application for [Amim]Cl Recovery, J. Chem. Eng. Data, 54:2470-2473 (2009).
Fukuyama et al., A Copper-Free Sonogashira Coupling Reaction in Ionic Liquids and Its Application to a Microflow System for Efficient Catalyst Recycling, Org. Lett., 4(10):1691-1694 (2002).
Gutowski et al., Controlling the Aqueous Miscibility of Ionic Liquids: Aqueous Biphasic Systems of Water-Miscible Ionic Liquids and Water-Structuring Salts for Recycle, Metathesis, and Separations, J. Am. Chem. Soc., 125:6632-6633 (2003).
Holbrey et al., Mercury(II) partitioning from aqueous solutions with a new, hydrophobic ethylene-glycol functionalized bis-imidazolium ionic liquid, Green Chem., 5:129-135 (2003).
Huddleston et al., Characterization and Comparison of Hydrophilic and Hydrophobic Room Temperature Ionic Liquids Incorporating the Imidazolium Cation, Green Chem., 3:156-164 (2001).
International Search Report and Written Opinion for PCT/US2010/036904 dated Jan. 3, 2011.
Kadokawa et al., A facile preparation of gel materials from a solution of cellulose in ionic liquid, Carbohydrate Research, 343:769-772 (2008).
Min et al., Chitin and chitosan nanofibers: electrospinning of chitin and deacetylation of chitin nanofibers, Polymer, 45:7137-7142 (2004).
Official Methods of Analysis of the Association of Official Analytical Chemists, 13a ed.; Horwitz, W. Ed.; AOAC International, Washington, DC, pp. 14-15 (1980).
Qin et al., Dissolution or extraction of crustacean shells using ionic liquids to obtain high molecular weight purified chitin and direct production of chitin films and fibers, Green Chem., 12:968-971 (2010).
Remsing et al., Mechanism of cellulose dissolution in the ionic liquid 1-n-butyl-3-methylimidazolium chloride: a 13C and 35/37Cl NMR relaxation study on model systems, Chem. Commun., 1271-1273 (2006).
Rødde et al., A Seasonal Study of the Chemical Composition and Chitin Quality of Shrimp Shells obtained from Northern Shrimp (*Pandalus borealis*), Carbohydrate Polymers, 71:388-393 (2008).
Scurto et al., Carbon dioxide induced separation of ionic liquids and water, Chem. Commun., 572-573 (2003).
Mathews et al., Palladium catalysed Suzuki cross-coupling reactions in ambient temperature ionic liquids, Chem. Commun., 1249-1250 (2000).
Stepnowski, Solid-phase extraction of room-temperature imidazolium ionic liquids from aqueous environmental samples, Anal. Bioanal. Chem., 381:189-193 (2005).
Sukhanova et al., Investigation of Morphology of Chitin Fiber, Vysokomol. Soedin. Ser. B 31 (1989) 381; Chem. Abstr. 111(20):175985n.
Sun et al., Complete dissolution and partial delignification of wood in the ionic liquid 1-ethyl-3-methylimidazolium acetate, Green Chem., 11:646-655 (2009).
Vijayaraghavan et al., An Assessment on the Interaction of a Hydrophilic Ionic Liquid with Different Sorbents, Ind. Eng. Chem. Res., 48:7283-7288 (2009).

(56) References Cited

OTHER PUBLICATIONS

Xie et al., Chitin and chitosan dissolved in ionic liquids as reversible sorbents of CO2, Green Chem., 8:630-633 (2006).
Wu et al., Do we understand the recyclability of ionic liquids?, Chem. Eur. J., 15:1804-1810 (2009).
Wu et al., A novel biomass-ionic liquid platform for the utilization of native chitin, Polymer, 49:2321-2327 (2008).
Al-Adhami et al., Immobilization of Wood-Rotting Fungi Laccases on Modified Cellulose and Acrylic Carriers, J. Process Biochemistry, 37:1387-1394 (2002).
Ast et al., Efficient Assembly of Peptomers on Continous Surfaces, Tetrahedron Lett., 40:4317-4318 (1999).
Axegard, The Future Pulp Mill—A Biorefinery? Presentation at 1st International Biorefinery Workshop, Washington, DC., Jul. 20-21, 2005.
Benton et al., Effect of Room-Temperature Ionic Liquids as Replacements for Volatile Organic Solvents in Free-Radical Polymerization, Ionic Liquids, 818:125-133 (2002).
Biedron et al., Ionic Liquids as reaction Media for Polymeriazation Processes: Atom Transfer Radical Polymerization (ATRP) of Acrylates in Ionic Liquids, Polymer Int'l., 52(10):1584-1588 (2003).
Blankemeyer-Menge et al., Simultaneous Multiple Synthesis of Protected Peptide Fragments on 'Allyl'—Functionalized Cellulose Disc Supports, Tetrahedron Lett, 29:5871-5874 (1988).
Bonhôte et al., Hydrophobic, Highly Conductive Ambient-Temperature Molten Salts, Inorg. Chem., 35:1168-1178 (1996).
Bora et al., A Simple Method for Functionalization of Cellulose Membrane for Covalent Immoblization of Biomolecules, J. Membr. Sci., 250:215-222 (2005).
Cateto et al., Monitoring of lignin-based polyurethane synthesis by FTIR-ATR, Ind. Crops Prod., 27(2):168-174 (2008).
Chesney et al., Amino-Derivatised Beaded Cellulose Gels, Novel Accessible and Biodegradable Scavenger Resins for Solution Phase Cominatorial Synthesis, Green Chem., 2:57-62 (2000).
Earle et al., Ionic liquids. Green Solvents for the future, Pure Appl. Chem., 72(7):1391-1398 (2000).
El Seoud et al., Applications of ionic liquids in carbohydrate chemistry: A window of opportunities, Biomacromol, 8 (9):2629-2647 (2007).
Endres, Ionic Liquids: Solvents for the Electrodeposition of Metals and Semiconductors, Chem. Phys. Chem., 3 (2):144-154 (2002).
Fannin et al., Properties of 1,3-Dialkylimidazolium Chloride—Aluminum Choride Ionic Liquids. 2. Phase Transitions, Densities, Electrical Conductivities, and Viscosities, J. Phys. Chem., 88:2614-2621 (1984).
Fischer et al., Structural Changes of Cellulose Dissolved in Molten Salt Hydrates, 219th ACS National Meeting, San Francisco, CA (2000) (abstract).

Fort et al., Can ionic liquids dissolve wood? Processing and analysis of lignocellulosic materials with I-n-butyl-3-methylimidazolium chloride, Green Chem., 9:63-69 (2007).
Froehner et al., Properties of the Glycoprotein Laccase Imobilised by Two Methods, Acta Chem Scand B, 29:691-694 (1975).
Fukaya et al., Cellulose dissolution with polar ionic liquids under mild conditions: required factors for anions, Green Chem., 10:44-46 (2008).
Gallezot, Process options for converting renewable feedstocks to bioproducts, Green Chem., 9:295-302 (2007).
Gelbrich, Colloidal Structures Based on Topochemically Modified Cellulose, Papier (Heidelberg), 52:755-758 (1998).
Gemeiner, Immobilized Enzymes, Organelles and Cells, in Enzyme Engineering, Gemeiner, Ed., Ellis Horwood Series in Biochemistry and Biotechnology, Ellis Horwood Limited: West Sussex, England, pp. 158-179 (1992).
Gordon et al., Fused Organic Salts. 8. Properties of Molten Straight-Chain Isomers of Tetra-n-Pentylammonium Salts, J. Amer. Chem. Soc., 100(24):7445-7454 (1978).
Harkin et al., Lignification in Trees: Indication of Exclusive Peroxidase Participation, Science, 180:296-98 (1973).
Heinze et al., Unconventional Methods in Cellulose Functionalization, Prog. Polym. Sci., 26:1689-1762 (2001).
Hirayama, Rapid Confirmation and Revision of the Primary Structure of Bovine Serum Albumin by ESIMS and Frit-FAB LC/MS, Biochem. Biophys. Comm., 173:639-646 (1990).
Holbrey et al., The Phase Behaviour of 1-Alkyl-3-Methlimidazolium Tetrafluoroborates; Ionic Liquids and Ionic Liquid Crystals, J. Chem. Soc. Dalton Trans., 2133-2139 (1999).
Hasegawa et al., New Pretreatment Methods Combining a Hot Water Treatment and Water/Acetone Extraction for Thermo-Chemical Conversion of Biomass, Energy and Fuels, 18:755-760 (2004).
Kenealy et al., Pretreatments for Converting Wood into Paper and Chemicals, Materials, Chemicals and Energy from Forest Biomass; Argyropoulos, D.; ACS Symposium Series; American Chemical Society, Washington, DC, chapter 25, pp. 392-408 (2007).
Office Action for U.S. Appl. No. 13/129,060 dated Apr. 8, 2013.
International Search Report and Written Opinion, dated May 28, 2014, received in connection with International Application No. PCT/IB2014/058981.
Barber, et al., Coagulation of Chitin and Cellulose from 1-Ethyl-3-methylimidazolium Acetate Ionic-Liquid Solutions Using Carbon Dioxide, 125:12576-12579, 2013.
Gurau, et al., Demonstration of Chemisorption of Carbon Dioxide in 1,3-Dialkylimidazoliunn Acetate Ionic Liquids, Angewandte Chemie International Edition, 50:12024-12026, 2011.

\* cited by examiner

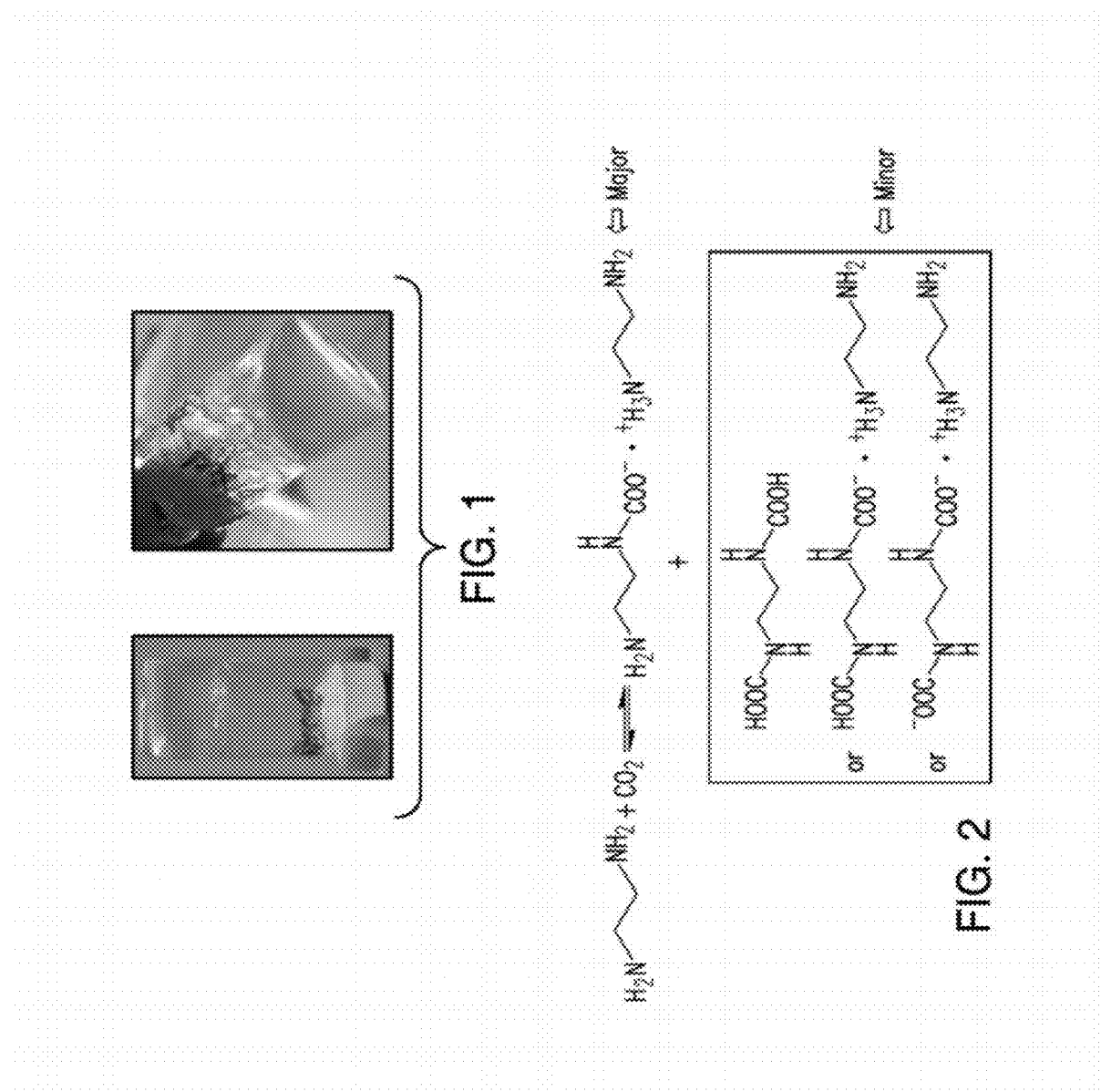

COMPOSITIONS CONTAINING RECYCLABLE IONIC LIQUIDS FOR USE IN BIOMASS PROCESSING

CROSS REFERENCE TO RELATED APPLICATIONS

This application claims the benefit of priority to U.S. Provisional Application No. 61/467,612, filed Mar. 25, 2011, which is incorporated by reference herein in its entirety.

FIELD

The subject matter disclosed herein generally relates to compositions containing biomass, ionic liquids, and amines for use in processing biomass. Also, the subject matter described herein generally relates to methods of recovering and reusing the ionic liquids used in biomass processing methods.

BACKGROUND

Ionic liquids (ILs) have been the subject of extensive research in recent years and currently represent a new-generation in chemistry. The availability of a variety of cations and anions lend to their unique properties, making them suitable for different applications with potential uses in various market segments, e.g., in the chemical, bio-chemical, pharmaceutical, and technical industries, as solvents, catalysts, electrolytes, or other types of chemicals. ILs also offer considerable efficiency and safety benefits.

ILs have received attention for their abilities to efficiently dissolve and process cellulose, chitin, and other natural biomaterials such as wood, which contains cellulose, hemicelluloses, and lignin (see Swatloski et al., *J. Am. Chem. Soc.* 2002, 124, 4974-4975; Sun et al., *J. Mater. Chem.* 2008, 18, 283-290; Qin et al., *Green Chem.* 2010, 12, 968-971; and Sun et al., *Green Chem.* 2009, 11, 646-655). The general procedure includes dissolving biomass in IL, then casting the IL-biomass solution on a glass plate and treating it with coagulating solvent (e.g., DI water or ethanol) to form a film; or extruding the IL-biomass solution into a water bath to produce fibers. In either of the procedures, water was mostly used as coagulant (a non solvent for biomass) to help precipitate biomass out of the IL solution and form the desired shape for target end use.

Even though ILs have found a number of industrial applications on biomass processing, several major challenges must be overcome to facilitate the application of the IL technologies into viable commercial process. Among these issues is the current high cost of ILs. Alternative manufacturing and mass-production schemes must be developed to produce an inexpensive IL that meets the desired application performance metrics. Even if the IL price could be sufficiently lowered, the process will need to operate in a closed-loop fashion (i.e., with recycling) to minimize the replenishment of the IL. This necessitates the development and engineering of a process that can efficiently deliver, transfer, and recover the IL.

Recovery of hydrophilic ILs from aqueous solution is highly energy intensive and generally more difficult than that of hydrophobic ILs (see Wu et al., *Chem. Eur. J.* 2009, 15, 1804-1810). The most common recovery method is to evaporate water out of the system to leave only the IL. However, the direct evaporation process is energy consuming, with much of the energy penalty attributed to boiling water during the IL regeneration, occurring at greater that 100° C. Also, if the IL to be recovered is thermodynamically unstable, such processes should be avoided or minimized.

Liquid-liquid extraction is another commonly used method to recycle catalyst and IL solvent in certain organic reactions. However, recovery has only been demonstrated for some hydrophobic ILs, such as $[BF_4]^-$ and $[PF_6]^-$ containing ILs (see Smith et al., *Chem. Commun.*, 2000, 1249-1250; Fukuyama et al., *Org. Lett.* 2002, 4, 1691-1694). Using organic solvent in liquid-liquid extraction can also diminish the green aspects of ILs. Aqueous biphasic systems (ABS) have been reported to have potential use for recycling hydrophilic ILs from aqueous solution. An ABS forms while adding a water-structuring salt like $K_3PO_4$ to an aqueous solution of 1-butyl-3-methylimidazolium chloride ($[C_4mim]Cl$) or 1-allyl-3-methylimidazolium chloride ([Amim]Cl) (see Gutowski et al., *J. Am. Chem. Soc.* 2003, 125, 6632-6633; Deng et al., *J. Chem. Eng. Data,* 2009, 54, 2470-2473). The bottom phase is $K_3PO_4$-rich while the upper phase is IL-rich, which is mixed with some water and salt. The IL could technically be recovered by drying the upper phase in a vacuum oven and then separating the crystallized $K_3PO_4$ by filtration. However, the major obstacle to applying this method into industrial practice is effectively removing the residue salt and water from the IL.

The applicability of an ion exchange mechanism to the enrichment of imidazolium ILs from environmental water samples has been proven using HPLC analysis. The results show it is possible to enrich 1-alkyl- and 1-aryl-3-methylimizadolium ILs on a strong cation exchange resin and furthermore to elute them selectively with developed eluent with yields above 90% (see Stepnowski et al., *Anal. Bioanal. Chem.* 2005, 381, 189-193). However, research on the sorption behavior of $[C_4mim]Cl$ towards a mixed-bed ion exchange resin showed that only 5% of the initially adsorbed $[C_4mim]$ cation could be desorbed (see Vijayaraghavan et al., *Ind. Eng. Chem. Res.* 2009, 48, 7283-7288). Both hydrophilic and hydrophobic ILs are able to be separated from water using $CO_2$ at temperatures between 15-25° C. and pressures below 5.2 MPa. Solutions of water and ILs can be induced to form two liquid phases (IL-rich and water-rich) and one gas phase (mostly $CO_2$ with a small amount of dissolved water) (see Scurto et al., *Chem. Commun.* 2003, 572-573). However, a complete separation of IL was not achieved using this approach.

SUMMARY

In accordance with the purposes of the disclosed materials, compounds, compositions, and methods, as embodied and broadly described herein, the disclosed subject matter, in one aspect, relates to compounds and compositions and methods for preparing and using such compounds and compositions. In a further aspect, the disclosed subject matter relates to methods of extracting biomass. The methods include providing a composition comprising a biomass and an ionic liquid. The ionic liquid can also include an amine or an amine can be added to the biomass-ionic liquid composition. Then the composition can be contacted with carbon dioxide in an amount effective to substantially precipitate the biomass from the composition, thereby forming a precipitated biomass. The disclosed subject matter also relates to ionic liquids, amines, and combinations thereof suitable for the dissolution and $CO_2$ induced precipitation of biomass.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DESCRIPTION OF DRAWINGS

The accompanying figures, which are incorporated in and constitute a part of this specification, illustrate several aspects described below.

FIG. 1 contains pictures of the products formed from the reaction of TEA and [C$_4$mim]Cl-MCC. The left panel shows a clear gel that formed after mixing TEA with [C$_4$mim]Cl-MCC solution at room temperature. The right panel shows a solid precipitated from the solution of [C$_4$mim]Cl-MCC-TEA upon bubbling CO$_2$ at 40° C. for 24 hours.

FIG. 2 is a schematic of the reversible reaction of EDA with CO$_2$ to form a mixture of two products. The major and minor products are indicated.

DETAILED DESCRIPTION

Figure 3:
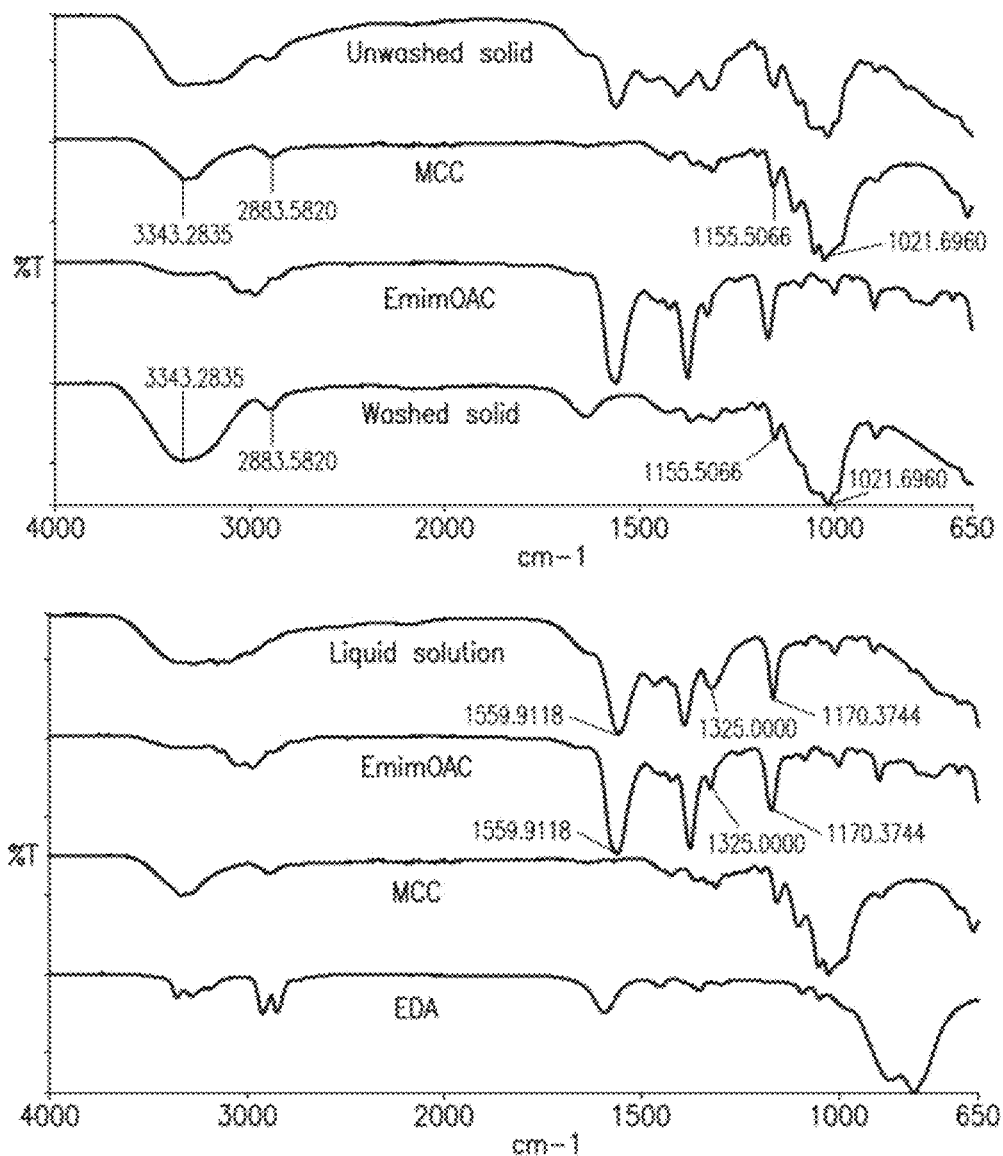
FIG. 3 is the IR spectra of the precipitated solid (top panel) and the separated liquid (bottom panel) from the [C$_2$mim]OAc-EDA-MCC-CO$_2$ system. Unreacted MCC, [C$_2$mim]OAc, and EDA served as controls.

Bara and his coworkers developed tunable solvents for reversibly capturing CO$_2$ using room-temperature ionic liquids (RTILs) and amines, and found RTIL-amine solutions (1:1 molar ratio) are capable of rapidly and reversibly capturing 1 mol of CO$_2$ per 2 moles MEA to give an insoluble MEA-carbamate precipitate that helps to drive the capture reaction (see Camper et al., *Ind. Eng. Chem. Res.* 2008, 47, 8496-8498; US Publication Nos. 2009/0291874 and 2009/0291872, which are incorporated by reference herein in their entireties for their teachings of RTILs, amines and their use in capturing gases). The captured CO$_2$ in the resulting RTIL-carbamate mixtures can be readily released by either heating and/or subjecting them to reduced pressure. Described herein are methods of efficiently recycling and reusing ionic liquids (ILs), including hydrophilic ILs, in biomass processing applications. ILs are able to dissolve biomass by forming hydrogen bonds between the IL anion and the hydroxyl groups of biomass (e.g., cellulose) (see Remsing et al., *Chem. Commun.*, 2006, 1271-1273, which is incorporated by reference herein in its entirety for its teaching of IL dissolution of biomass). Reducing the intermolecular forces between IL and biomass can force biomass out of IL solution in the form, for example, of films or fibers depending on the end use. Thus, ILs are recoverable and reusable without using water as a coagulant, thus eliminating future water removal issues.

Alkanolamines have been used to absorb acidic gases like CO$_2$ and H$_2$S. The amines of principal commercial interest for gas purification include monoethanolamine (MEA), diethanolamine (DEA), triethanolamine (TEA), and methyldiethanolamine (MDEA). Each has at least one hydroxyl group and one amino group. Not to be bound by theory, it can be considered that the hydroxyl group serves to reduce the vapor pressure and increase the water solubility, while the amine group provides the necessary alkalinity in water solutions to cause the absorption of acidic gases (see Hohl et al., *Gas Purification*, 5$^{th}$ edition, 1997, chapter 2). Brennecke has found many ILs dissolve a considerable amount of CO$_2$ (see Scurto et al., *Chem. Commun.* 2003, 572-573, which is incorporated by reference herein in its entirety for its teachings of IL based CO$_2$ dissolution). Bara, as previously mentioned, found IL-amine has been used to reversibly capture CO$_2$ based on the facts that some alkanolamines are soluble in ILs and the dissolved amine can react with CO$_2$ to form alkanolamine-carbamate. Described herein are methods of changing the solubility of biomass in IL by introducing amines into the IL-biomass system. In some embodiments, these methods are applicable to producing cellulose or chitin films and fibers. In addition, methods of recovering and reusing the ILs are provided herein.

The materials, compounds, compositions, and methods described herein may be understood more readily by reference to the following detailed description of specific aspects of the disclosed subject matter, the Figures, and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

DEFINITIONS

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an amine" includes mixtures of two or more such amines, reference to "the ionic liquid" includes mixtures of two or more such ionic liquids, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. "About" can mean within 5% of the stated value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "2000" is disclosed, then "about 2000" is also disclosed. It is also understood that when a value is disclosed, then "less than or equal to" the value, "greater than or equal to the value" and possible ranges between values are also disclosed, as appropriately understood by the skilled artisan. For example, if the value "2000" is disclosed, then "less than or equal to 2000" as well as "greater than or equal to 2000" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound comprising 2 parts by weight of component X and 5 parts by weight component Y, X and Y are present at a weight ratio of 2:5, and are present in such ratio regardless of whether additional components are comprised in the composition.

A weight percent (wt. %) of a component, unless specifically stated to the contrary, is based on the total weight of the formulation or composition in which the component is included.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$A^1$," "$A^2$," "$A^3$," and "$A^4$" are used herein as generic symbols to represent various substituents. These symbols can be any substituent, not limited to those disclosed herein, and when they are defined to be certain substituents in one sentence it does not mean that, in another sentence, they cannot be defined as some other substituents.

The term "alkyl" as used herein is a branched or unbranched saturated hydrocarbon group of 1 to 24 carbon atoms, such as methyl ($C_1$), ethyl ($C_2$), n-propyl ($C_3$), isopropyl ($C_3$), n-butyl ($C_4$), isobutyl ($C_4$), t-butyl ($C_4$), pentyl ($C_5$), hexyl ($C_6$), heptyl ($C_7$), octyl ($C_8$), nonyl ($C_9$), decyl ($C_{10}$), dodecyl ($C_{12}$), tetradecyl ($C_{14}$), hexadecyl ($C_{16}$), octadecyl ($C_{18}$), eicosyl ($C_{20}$), tetracosyl ($C_{24}$), and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below. Abbreviations for various alkyl groups used herein are as follows: Me is methyl ($CH_3$), Et is ethyl ($C_2H_5$), Pr is propyl ($C_3H_7$), Bu is butyl ($C_4H_9$), etc.

Throughout the specification, "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage.

The term alkoxylalkyl as used herein is an alkyl group that comprises an alkoxy substituent.

The term "alkenyl" or "alkene" or "alkylene" as used herein is a hydrocarbon group of from 2 to 24 carbon atoms with a structural formula comprising at least one carbon-carbon double bond. Asymmetric structures such as ($A^1A^2$)C=C($A^3A^4$) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that comprises any carbon-based aromatic group including, but not limited to, benzene, naphthalene, phenyl, biphenyl, phenoxybenzene, and the like. The term "heteroaryl" is defined as a group that comprises an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is included in the term "aryl," defines a group that comprises an aromatic group that does not comprise a heteroatom. The aryl and heteroaryl groups can be substituted or unsubstituted. The aryl and heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can comprise one or more aryl groups, one or more non-aryl groups, or one or more aryl groups and one or more non-aryl groups.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

The general term "polymer" includes homopolymer, copolymer, terpolymer, natural and synthetic polymers, biopolymers, fractionation polymers, etc. unless the context clearly dictates otherwise. When the prefix "poly" is used, reference is made to the product of polymerization of a monomer. Thus, the term "polyalkylene glycol" includes any polymerization product of the alkylene glycol monomer to which reference is made. The specific term "fractionation polymer" is used herein to identify a polymer that separates into its own phase when admixed with an ionic liquid at a given set of parameters, as are described herein for use in the disclosed multiphasic fractionation processes. This term is used as a mere aid to distinguish such polymers from among the various polymer components of biomass (e.g., polysaccharides proteins), which can be also present in the system.

Molecular weights can be expressed in units of molecular mass, i.e., g/mol, or more broadly in units of atomic mass, i.e., Daltons. These two unit expressions can be used interchangeably and, for the purposes of this disclosure, are synonymous. When in reference to a polymer, molecular weights can or cannot be the true molecular weight of the disclosed polymer. Also, disclosed polymer molecular weights can often represent a value advertised by a commercial supplier and/or molecular weights determined through reference of a polymer standard using, for example, liquid chromatography. This disclosure does not intend to be limited by this practice as those skilled in art are aware of these conventions.

Unless otherwise specified, a "molecular weight" of a polymer refers to the relative average chain length of the bulk polymer. In practice, molecular weight can be estimated or characterized in various ways including gel permeation chromatography (GPC) or capillary viscometry. GPC molecular weights are reported as the weight-average molecular weight ($M_w$) as opposed to the number-average molecular weight ($M_n$). Capillary viscometry provides estimates of molecular weight as the inherent viscosity determined from a dilute polymer solution using a particular set of concentration, temperature, and solvent conditions.

The term "number average molecular weight" ($M_n$) is defined herein as the mass of all polymer molecules divided by the number of polymer molecules which are present.

The term "weight average molecular weight" ($M_w$) is defined herein as the mass of a sample of a polymer divided by the total number of molecules that are present.

The term "polydispersity" or "polydispersity index" or "PDI" is defined herein as the weight average molecular weight, $M_w$, divided by the number average molecular weight, $M_n$.

The term "processing" is used herein to generally refer to the various treatments that a biomass can undergo, for example, physical treatments such as mixing, fractioning, drying, dying, and chemical treatments such as degradation, delignification, derivatization, functional group transformation (e.g., acetylation and deacetylation), fermentation, and the like.

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of cations A, B, and C are disclosed as well as a class of anions D, E, and F and an example of an ionic liquid A-D is disclosed, then even if each is not individually recited, each is individually and collectively contemplated. Thus, in this example, each of the ionic liquids A-E, A-F, B-D, B-E, B-F, C-D, C-E, and C-F are specifically contemplated and should be considered disclosed from disclosure of cations A, B, and C; anions D, E, and F; and the example ionic liquid A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, compositions and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Reference will now be made in detail to specific aspects of the disclosed materials, compounds, compositions, components, devices, articles, and methods, examples of which are illustrated in the following description and examples, and in the figures and their previous and following description.

Materials and Methods

Disclosed herein are compositions containing ionic liquids (ILs) and biomass. The compositions also contain amines, either added before, during, or after biomass is added to the IL. Methods that involve the use of these compositions for processing biomass are also disclosed. For example, in one embodiment, the compositions are used to dissolve biomass in order to process and transform biomass and components thereof. In a further embodiment, methods of recovering and reusing the compositions after use in processing biomass are disclosed.

Biomass

In the disclosed methods and compositions, biomass is used, fractioned, treated, derivitized, and/or otherwise processed. The term "biomass," as used herein, refers to living or dead biological material that can be used in one or more of the disclosed processes. Biomass can comprise any cellulosic or lignocellulosic material and includes materials comprising cellulose and/or chitin, and optionally further comprising hemicellulose, lignin, starch, oligosaccharides and/or monosaccharides, biopolymers, natural derivatives of biopolymers, their mixtures, and breakdown products (e.g., metabolites). Biomass can also comprise additional components, such as protein and/or lipid. Biomass can be derived from a single source, or biomass can comprise a mixture derived from more than one source. Some specific examples of biomass include, but are not limited to, bioenergy crops, agricultural residues, municipal solid waste, industrial solid waste, sludge from paper manufacture, yard waste, wood, and forestry waste. Additional examples of biomass include, but are not limited to, corn grain, corn cobs, crop residues such as corn husks, corn stover, grasses, wheat, wheat straw, hay, rice straw, switchgrass, waste paper, sugar cane bagasse, sorghum, soy, components obtained from milling of grains, trees (e.g., pine), branches, roots, leaves, wood chips, wood pulp, sawdust, shrubs and bushes, vegetables, fruits, flowers, animal manure, multi-component feed, and crustacean biomass (i.e., chitinous biomass).

Lignocellulosic biomass typically comprises of three major components: cellulose, hemicellulose, and lignin, along with some extractive materials (Sjostorm, E. Wood Chemistry: Fundamentals and Applications, 2nd ed., 1993, New York). Depending on the source, their relative compositions usually vary to certain extent. Cellulose is the most abundant polymer on Earth and enormous effort has been put into understanding its structure, biosynthesis, function, and degradation (Stick, R. V. Carbohydrates—The Sweet Molecules of Life, 2001, Academic Press, New York). Cellulose is actually a polysaccharide consisting of linear chain of several hundred to over ten thousand $\beta(1\rightarrow4)$ linked D-glucose units. The chains are hydrogen bonded either in parallel or anti-parallel manner which imparts more rigidity to the structure, and a subsequent packaging of bound-chains into microfibrils forms the ultimate building material of the nature.

Hemicellulose is the principal non-cellulosic polysaccharide in lignocellulosic biomass. Hemicellulose is a branched heteropolymer, consisting of different sugar monomers with 500-3000 units. Hemicellulose is usually amorphous and has higher reactivity than the glucose residue because of different ring structures and ring configurations. Lignin is the most complex naturally occurring high-molecular weight polymer (Hon, D. N. S.; Shiraishi, N., Eds., Wood and Cellulosic Chemistry, 2nd ed., 2001, Marcel Dekker, Inc., New York). Lignin relatively hydrophobic and aromatic in nature, but lacks a defined primary structure. Softwood lignin primarily comprises guaiacyl units, and hardwood lignin comprises both guaiacyl and syringyl units. Cellulose content in both hardwood and softwood is about 43±2%. Typical hemicellulose content in wood is about 28-35 wt %, depending on type of wood. Lignin content in hardwood is about 18-25% while softwood may contain about 25-35% of lignin.

While each of these components could be used in a wide variety of applications including synthesis of platform and commodity chemicals, materials, and production of energy, these components can rarely be separated from biomass in their original form. The principal reason has been the need of a universal processing media for biomass. The components of lignocellulosic biomass are held together by primary lignocellulosic bonds. Lignocellulosic bonds are varied in nature and typically comprise cross-linked networks. Traditionally, lignocellulosic biomass cannot be dissolved without degrading in any conventional solvents, and it can be difficult to separate these components in a pure form. However, immense possibilities of separated lignin and hemicellulose-based products have been widely studied (Axegard, P., The Future Pulp Mill—A Biorefinery?, Presentation at 1st International Biorefinery Workshop, Washington, D.C., Jul. 20-21, 2005). The impact of different process options to convert renewable lignocellulosic feedstocks into valuable chemicals and polymers has been summarized by Gallezot (*Green Chem.* 2007, 9, 295-302, which is incorporated by reference herein in its entirety for its teaching of feedstock processing).

Chitin is a naturally occurring polymer found in chitinous biomass, including, for example, the exoskeletons of marine crustaceans. Chitin is an N-acetyl-D-glucosamine polymer and has a similar structure to cellulose. It is abundant in nature, comprising the horny substance in the exoskeletons of crustaceans (e.g., crab, shrimp, lobster, and crayfish). These sources of chitin are suitable for use in the methods and compositions disclosed herein.

The chitinous biomass (e.g., the exoskeletons) can be mixed directly with an ionic liquid to extract the chitin. The chitinous biomass used can be also treated, derivitized, and/or otherwise processed in ILs. As described above, exoskeletons include chitin. Exoskeletons can further include additional components, such as proteins, lipids, and salts.

In one aspect, polysaccharides, such as cellulose and chitin, can be separated from biomass and processed into fibers or films.

Ionic Liquids

In general, ionic liquids can be used to first provide a solution of biomass. ILs have been used to solve processing problems due to their non-volatility, solubilizing properties, recycling ability, and ease of processing (see Rogers and Seddon, *Science* 2003, 302:792, which is incorporated by reference herein in its entirety for its teachings of ILs). ILs can often be viable alternatives to traditional industrial solvents comprising volatile organic compounds (VOCs). In particular, the use of ILs can substantially limit the amount of organic contaminants released into the environment. As such, ILs are at the forefront of a growing field known as "green chemistry."

Cellulose, an often major component of biomass, for example, has been shown to be capable of dissolution in ILs (Swatloski et al., *J. Am. Chem. Soc.* 2002, 124, 4974-4975, PCT Publication No. WO03/029329 A2; PCT Publication No. WO09/105,236; Swatloski et al., "Ionic Liquids for the Dissolution and Regeneration of Cellulose," In Molten Salts XIII: Proceedings of the International Symposium, Trulove, et al., Eds., The Electrochemical Society: Pennington, N.J., 2002, Vol. 2002-19, pp. 155-164, which are incorporated by reference herein in their entireties for their teachings of ILs and biomass processing therein). Components of biomass have also been reportedly dissolved in ILs (WO05/017252; WO09/105,236; and Pu et al., *J. Wood Chem. Technol.*, 2007, 27, 23-3, which are incorporated by reference herein in their entireties for their teachings of ILs and biomass processing therein). It has even been demonstrated that both softwood and hardwood can be directly dissolved in a number of ILs (Fort et al., *Green Chem.*, 2007, 9, 63-69; Kilpelainen et al., *J. Agric. Food Chem.*, 2007, 55, 9142-9148, which are incorporated by reference herein in their entireties for their teachings of ILs and biomass processing therein). ILs have even been used as a delignification media that allows simultaneous dissolution and delignification of lignocellulosic biomass under microwave heating (see US Application Publication No. 2008/0023162, which is incorporated by reference herein in its entirety). Further examples of ionic liquids for processing biomass are provided in PCT Publication Nos. WO 2009/105236 and WO 2010/056790, which are incorporated by reference herein in their entireties for their teachings of ILs and biomass processing therein. The ionic liquids disclosed in these references can all be used in the methods and compositions disclosed herein.

The ionic liquids that can be used in the disclosed methods and compositions comprise ionized species (i.e., cations and anions) and have melting points below about 150° C. For example, the disclosed ionic liquids can be liquid at or below a temperature of about 120° C. or about 100° C., and at or above a temperature of about −100° C. or about −44° C. For example, N-alkylisoquinolinium and N-alkylquinolinium halide salts have melting points of less than about 150° C. The melting point of N-methylisoquinolinium chloride is 183° C., and N-ethylquinolinium iodide has a melting point of 158° C. In other examples, a contemplated ionic liquid is liquid (molten) at or below a temperature of about 120° C. and above a temperature of about −44° C. In some examples, a suitable ionic liquid can be liquid (molten) at a temperature of about −10° C. to about 100° C.

Ionic liquids suitable for use herein can be hydrophilic or hydrophobic and can be substantially free of water, a water- or alcohol-miscible organic solvent, and/or nitrogen-comprising base. By substantially free is meant the water, water or alcohol-miscible organic solvent, and/or nitrogen comprising base is less than about 5 wt % of the composition, e.g., less than about 4, 2, 3, 1 wt %. Contemplated organic solvents of which the ionic liquid can be substantially free of include solvents such as dimethyl sulfoxide, dimethyl formamide, acetamide, hexamethyl phosphoramide, water-soluble alcohols, ketones or aldehydes such as ethanol, methanol, 1- or 2-propanol, tert-butanol, acetone, methyl ethyl ketone, acetaldehyde, propionaldehyde, ethylene glycol, propylene glycol, the $C_1$-$C_4$ alkyl and alkoxy ethylene glycols and propylene glycols such as 2-methoxyethanol, 2-ethoxyethanol, 2-butoxyethanol, diethyleneglycol, and the like.

Cations

As noted, ionic liquids contain one or more types of cations and one or more types of anions. A suitable cation of a hydrophilic ionic liquid can be cyclic and correspond in structure to a formula shown below:

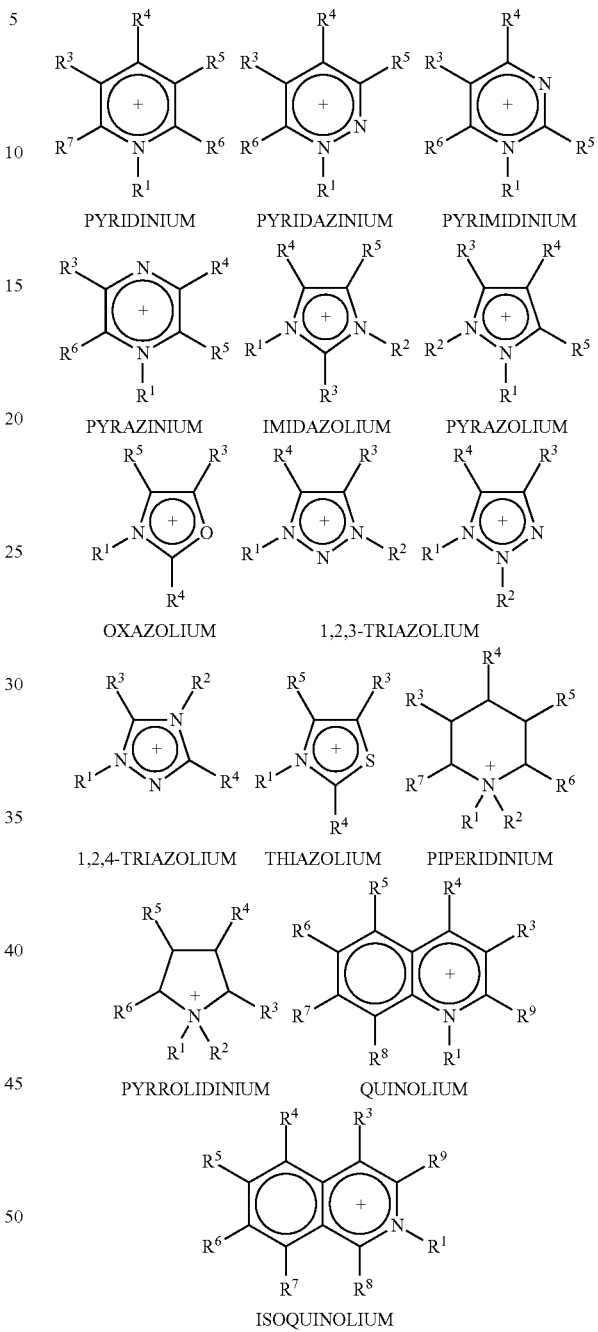

wherein $R^1$ and $R^2$ are independently a $C_1$-$C_6$ alkyl group or a $C_2$-$C_6$ alkoxyalkyl group, and $R^3$, $R^4$, $R^5$, $R^6$, $R^7$, $R^8$, and $R^9$ ($R^3$-$R^9$), when present, are independently H, a $C_1$-$C_6$ alkyl, a $C_2$-$C_6$ alkoxyalkyl group, or a $C_1$-$C_6$ alkoxy group. In other examples, both $R^1$ and $R^2$ groups are $C_1$-$C_4$ alkyl, with one being methyl, and $R^3$-$R^9$, when present, are H. Exemplary $C_1$-$C_6$ alkyl groups and $C_1$-$C_4$ alkyl groups include methyl, ethyl, propyl, iso-propyl, butyl, sec-butyl, iso-butyl, pentyl, iso-pentyl, hexyl, 2-ethylbutyl, 2-methylpentyl, and the like. Corresponding $C_1$-$C_6$ alkoxy groups comprise the above $C_1$-$C_6$ alkyl group bonded to an oxygen atom that is also bonded to the cation ring. A $C_2$-$C_6$ alkoxyalkyl group comprises an ether group bonded to an alkyl group with a total of up to six carbon atoms. It is to be noted that there are two isomeric 1,2,3-triazoles. In some examples, all R groups not required for cation formation can be H. Specific examples of suitable cations include 1-ethyl-3-methylimidazolium and 1-butyl-3-methylimidazolium. Further examples of such ILs for the dissolution of cellulose are disclosed in U.S. Pat. No. 6,824,599 and Swatloski et al., *J. Am. Chem. Soc.* 2002, 124:4974-4975, which are incorporated by reference herein for their teachings of ionic liquid and uses thereof. Examples of chitin dissolution in ILs can be found in WO2010/141470, which is incorporated by reference herein for their teachings of ionic liquids and uses thereof.

The phrase "when present" is often used herein in regard to substituent R group because not all cations have all of the numbered R groups. All of the contemplated cations comprise at least four R groups, which can, in various examples, be H.

The phrases "substantial absence" and "substantially free" are used synonymously to mean that less than about 5 weight percent, more particularly less than about 1 weight percent, water or other referenced substance is present. For example, it has been reported in Swatloski et al., *J. Am. Chem. Soc.* 2002, 124:4974-4975, that cellulose is no longer soluble in certain ionic liquids if water content is above about 1 weight percent. It should be appreciated, however, that some water may be present since the biomass component is often only partially dry and the ionic liquid itself may contain residual amounts of water. Such residual amounts should be taken into account even though a system is described to be "substantially free of" or "substantially absent" water. The same meaning is intended regarding the presence of a nitrogen-comprising base, alcohol, or other water or alcohol-miscible organic solvent.

In one example, all R groups that are not required for cation formation, i.e., those other than $R^1$ and $R^2$ for compounds other than the imidazolium, pyrazolium, and triazolium cations shown above, are H. Thus, the cations shown above can have a structure that corresponds to a structure shown below, wherein $R^1$ and $R^2$ are as described before.

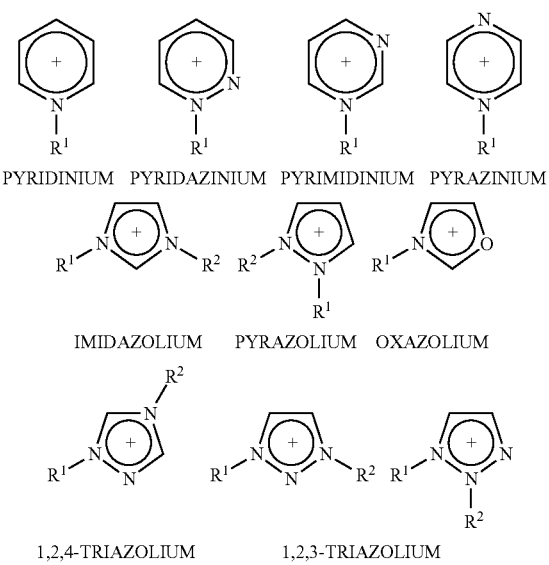

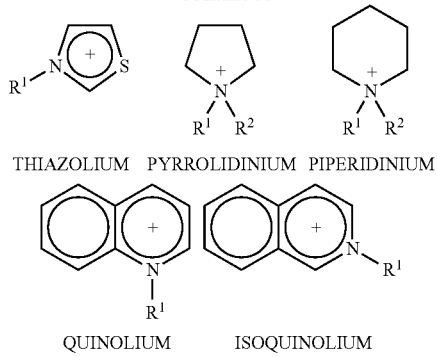

A cation that comprises a single five-membered ring that is free of fusion to other ring structures is also a suitable IL cation for the compositions and methods disclosed herein.

Still further examples of cations for suitable ILs include ammonium, alkoxyalkyl imidazolium, alkanolyl substituted ammonium, alkoxyalkyl substituted ammonium, aminoalkyl substituted ammonium.

Anions

An anion for a contemplated ionic liquid cation can be a halide (fluoride, chloride, bromide, or iodide), perchlorate, a sulfate, or $C_1$-$C_6$ carboxylate.

Carboxylates are preferred due to their ability to disrupt H-bonding. Carboxylate anions that comprise 1-6 carbon atoms ($C_1$-$C_6$ carboxylate) are illustrated by formate, acetate, propionate, butyrate, hexanoate, maleate, fumarate, oxalate, lactate, pyruvate, and the like, are also suitable for appropriate contemplated ionic liquid cations. Further examples include sulfonated or halogenated carboxylates.

Sulfate anions, such as tosylate, mesylate, trifluoromethanesulfonate, trifluoroethane sulfonate, di-trifluoromethanesulfonyl amino, docusate, and xylenesulfonate (see WO2005017252, which is incorporated by reference herein for ionic liquids with anions derived from sulfonated aryls) are also suitable for use as the anionic component of an IL.

Still other examples of anions that can be present in the disclosed ILs include, but are not limited to, other sulfates, sulfites, phosphates, phosphonates (see Fukaya et al., *Green Chem.*, 2008, 10:44-46), phosphites, nitrate, nitrites, hypochlorite, chlorite, bicarbonates, and the like, including mixtures thereof.

Specific Examples

Suitable ILs for the disclosed compositions and methods can comprise any of the cations and anions disclosed herein. For example, a suitable ionic liquid can be 1-alkyl-3-methylimidazolium halide, 1-alkyl-3-methylimidazolium $C_{1-6}$ carboxylate. Some specific examples of suitable ILs that can be used in the disclosed compositions and methods include, but are not limited to, allylmethylimidazolium Cl, allylbutylimidazolium Cl, diallylimidazolium Cl, allyloxymethylimidazolium Cl, allylhydroxyethylimidazolium Cl, allylmethylimidazolium formate, allylmethylimidazolium OAc, benzylmethylimidazolium Cl, bis(methylimidazolium)sulfoxide Cl, ethylmethylimidazolium benzoate, ethylmethylimidazolium $CF_3SO_3$, ethylmethylimidazolium Cl, ethylmethylimidazolium OAc, ethylmethylimidazolium xylenesulfonate, ethylmethylimidazolium methylphosphonate, propylmethylimidazolium formate, butylmethylimidazolium Cl, butylmethylimidazolium OAc, butylmethylimidazolium Cl+FeCl₃, butylmethylimidazolium MeSO₄, butylmethylimidazolium (CN₂)N—, butyl-2,3-dimethylimidazolium Cl, methylhydroxyethylimidazolium Cl, N,N'-dimethylimidazolium Cl, N,N'-dimethylimidazolium MeSO₄, N,N'-dimethylimidazolium OAc, 1-(2-hydroxylethyl)-3-methylimidazoium Cl, 1-methyl-3-(4-vinylbenzyl)imidazolium Cl, 3,3-ethane-1,2-dylbis(methylimidazolium)dichloride, 3,3-ethane-1,2-dylbis(methylimidazolium)dichloroaluminate, 1-vinyl-3-(4-vinylbenzyl)imidazolium Cl, diethyl N-methyl-N-(2-methoxyethyl)ammonium Tf₂N, hydroxybutyl trimethylammonium carbamate, nitronium Tf₂N, tetrabutylammonium benzoate, tetrabutylammonium, dodecylbenzenesulfonate, tetrabutylammonium OH, tetrabutylammonium xylenesulfonate, phenyltributylammonium xylenesulfonate, allylmethylpyridinium Cl, benzylpyridinium Cl, butylmethyl pyrrolidinium 4-hydroxybenzenesulfonate, ethylpyridinium Br, trihexyltetradecylphosphonium xylenesulfonate, choline Cl+urea, choline Cl+ZnCl₂.

Amines

The compositions described herein ultimately include one or more amine compounds. The amine can be added to the ionic liquid before the biomass is contacted with the ionic liquid. Alternatively, the biomass can be added to the ionic liquid first, and then the amine is added to the ionic liquid-biomass composition. In still another example, the ionic liquid and the amine can be contacted to the biomass simultaneously. The amine can be a primary amine, a secondary amine, a tertiary amine, a cyclic amine, or a mixture thereof. The amine compounds described herein can be represented by the following structure:

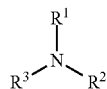

wherein R¹, R², and R³ can each independently be selected from the group consisting of hydrogen, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, silyl, siloxyl, or cyano.

In some embodiments, the amine can be a primary amine. According to these examples, two of R¹, R², or R³ are hydrogen and the remaining group is other than hydrogen to form a compound as shown below:

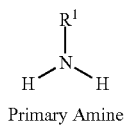
Primary Amine wherein R¹ is selected from substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, or substituted or unsubstituted aryloxyl. Particular examples of primary amines as described herein include butylamine (BA), monoethanolamine (MEA), ethylenediamine (EDA), pentylamine (PA), diglycolamine (DGA), and 2-amino-2-methylpropanol (AMP).

In some embodiments, the amine can be a secondary amine where one of R¹, R², or R³ is hydrogen and the remaining two groups are other than hydrogen. Secondary amines as described herein can be represented by the structure shown below:

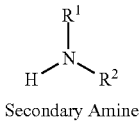
Secondary Amine wherein R¹ and R² are each independently selected from substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, or substituted or unsubstituted aryloxyl. Particular examples of secondary amines as described herein include diethanolamine (DEA) and diisopropanolamine (DIPA).

In further embodiments, the amine can be a tertiary amine where each of R¹, R², and R³ are other than hydrogen as represented by the following structure:

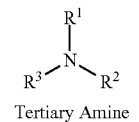
Tertiary Amine wherein R¹, R², and R³ are each independently selected from substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, or substituted or unsubstituted aryloxyl. Particular examples of tertiary amines include triethanolamine (TEA) and N-methyldiethanolamine (MDEA).

The amines for use in the compositions and methods described herein can also include cyclic amines. According to these examples, two of R¹, R², or R³ can combine to form a substituted or unsubstituted aryl, substituted or unsubstituted heteroaryl, substituted or unsubstituted cycloalkyl, substituted or unsubstituted cycloalkenyl, substituted or unsubstituted cycloalkynyl, substituted or unsubstituted heterocycloalkyl, substituted or unsubstituted heterocycloalkenyl, or substituted or unsubstituted heterocycloalkynyl. The cyclic amines can be represented by the following structure:

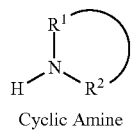

Cyclic Amine wherein the line connecting $R^1$ and $R^2$ represents a connection between $R^1$ and $R^2$ that forms a cyclic structure including $R^1$, N, and $R^2$. An example of a suitable cyclic amine for use in the systems described herein includes a substituted or unsubstituted piperazine (PZ).

In some embodiments, the primary, secondary, tertiary, or cyclic amine can be an alkanolamine (i.e., one or more substituents of the amine can include alcohol groups). Examples of suitable alkanolamines include monoethanolamine (MEA), diethanolamine (DEA), and triethanolamine (TEA).

The amine described herein can contain one amino functional group (i.e., can be a monoamine) or can contain two amino functional groups (i.e., can be a diamine), or can contain more than two amino functional groups (i.e., can be a polyamine).

Compositions

The compositions described herein include biomass, one or more ionic liquids, and one or more amines. In these compositions, biomass is typically dissolved in the ionic liquids, optionally, in the presence of one or more amines. For example, biomass can be dissolved in IL prior to or after the addition of amine. A contemplated solution of biomass in ionic liquid can contain cellulose in an amount of from about 5 to about 35 wt. %, from about 5 to about 25 wt. %, from about 5 to about 20 wt. %, from about 5 to about 15 wt. %, from about 10 to about 35 wt. %, from about 10 to about 25 wt. %, from about 15 to about 35 wt. %, or from about 15 to about 25 wt. % of the solution. In other examples, the ionic liquid can contain cellulose in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 wt. % of the solution, where any of the stated values can form an upper or lower endpoint. Further, a solution of biomass in an ionic liquid can contain cellulose in an amount of from about 5 to about 35 parts by weight, from about 5 to about 25 parts by weight, from about 5 to about 20 parts by weight, from about 5 to about 15 parts by weight, from about 10 to about 35 parts by weight, from about 10 to about 25 parts by weight, from about 15 to about 35 parts by weight, or from about 15 to about 25 parts by weight of the solution. In other examples, the ionic liquid can contain cellulose in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 parts by weight of the solution, where any of the stated values can form an upper or lower endpoint.

In other embodiments, a contemplated solution of biomass in ionic liquid can contain chitin in an amount of from about 5 to about 35 wt. %, from about 5 to about 25 wt. %, from about 5 to about 20 wt. %, from about 5 to about 15 wt. %, from about 10 to about 35 wt. %, from about 10 to about 25 wt. %, from about 15 to about 35 wt. %, or from about 15 to about 25 wt. % of the solution. In other examples, the ionic liquid can contain chitin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 wt. % of the solution, where any of the stated values can form an upper or lower endpoint. Further, a solution of biomass in an ionic liquid can contain chitin in an amount of from about 5 to about 35 parts by weight, from about 5 to about 25 parts by weight, from about 5 to about 20 parts by weight, from about 5 to about 15 parts by weight, from about 10 to about 35 parts by weight, from about 10 to about 25 parts by weight, from about 15 to about 35 parts by weight, or from about 15 to about 25 parts by weight of the solution. In other examples, the ionic liquid can contain chitin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 parts by weight of the solution, where any of the stated values can form an upper or lower endpoint.

Components of the various compositions disclosed herein can be present in various weight percentages with respect to the mixture or with respect to individual components. For example, an ionic liquid can be present in a mixture of ionic liquid and amine in a weight percentage of about 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% of the composition, where any of the stated values can form an upper or lower endpoint of a range. In further examples, the ionic liquid can comprise from about 1% to about 99%, about 10% to about 90%, about 20% to about 80%, about 30% to about 70%, about 40% to about 60%, or about 50% of the composition.

Likewise, the amine can be present in a mixture of ionic liquid and amine in a weight percentage of about 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% of the composition, where any of the stated values can form an upper or lower endpoint of a range. In further examples, the amine can comprise from about 1% to about 99%, about 10% to about 90%, about 20% to about 80%, about 30% to about 70%, about 40% to about 60%, or about 50% of the composition.

In some embodiments, the composition can have an ionic liquid to amine ratio of 9:1, 8:1, 7:1, 6:1, 5:1, 4:1, 3:1, 2:1, 1:1, and the like. In other embodiments, the system can have an amine to ionic liquid ratio of 9:1, 8:1, 7:1, 6:1, 5:1, 4:1, 3:1, 2:1, 1:1, and the like.

In one embodiment, the ionic liquid to amine ratio of the composition is 1:1. Such ratios, however, are intended to be exemplary, and other suitable ratios are specifically contemplated.

The disclosed ionic liquid and amine compositions can optionally comprise other components, for example, processing aids, catalysts, surfactants, viscosity modifiers, and/or other additives.

The compositions described herein can be substantially free from water. By substantially free is meant that water is present at less than about 5%, 4%, 3%, 2%, 1%, 0.9%, 0.8%, 0.7%, 0.6%, 0.5%, 0.4%, 0.3%, 0.2%, 0.1%, 0.001%, or 0.0001%.

Biomass Dissolution and Processing

Disclosed herein are methods of dissolving biomass in ILs or mixtures of ILs and amines. In one aspect, biomass can be dissolved in an ionic liquid. In a further aspect, after the biomass is dissolved in the ionic liquid, an amine can be added to the biomass and ionic liquid mixture. Alternatively, the biomass can be dissolved in an ionic liquid in the presence of an amine.

In a specific example of this embodiment, a biomass (e.g., lignocellulosic, crustacean, or other type of biomass disclosed herein) is completely or partially dissolved or suspended in an IL at up to about 50 wt %. In some examples, the mixture containing the biomass, ionic liquid, and optionally the amine can be heated to facilitate dissolving the biomass. For example, the mixture can be heated to a temperature of from about 0° C. to about 250° C. (e.g., from about 50° C. to about 150° C. or from about 80° C. to about 130° C.) for up to 24 hours or longer. Catalysts and any optional additives can be used to increase dissolution, facilitate disintegration, cleave bonds, separate biopolymers from biomass, and for derivatization and other treatments of biomass and their components. The dissolution can be performed in air or under inert environment depending on catalyst(s) and additive(s) used.

Because of their ionic nature, ionic liquids are excellent media for utilizing microwave techniques. The commonly used frequency for microwave energy is 2.45 GHz. In the disclosed methods, the frequency for microwave energy can be reduced. In some aspects, the lower frequency results in higher dissolution of the biomass. For example, the frequency for microwave energy can be less than 2.0 GHz, less than 1.5 GHz, or less than 1.0 GHz. In some aspects, the frequency for microwave energy is 990 MHz or less, 980 MHz or less, 970 MHz or less, 960 MHz or less, 950 MHz or less, 940 MHz or less, 930 MHz or less, 920 MHz or less, 915 MHz or less, 910 MHz or less, or 900 MHz or less. In some aspects, the frequency for microwave energy is 915 MHz.

Any processing time can be used to get the biomass to at least partially dissolve in the mixture, for example from seconds to hours, such as from 1 to 16 hours, 1 to 12 hours, or from 1 to 5 hours. At lower temperatures, the processing time is longer. At higher temperatures or under microwave irradiation, the processing time is shorter.

One or more amines can be added to the system (i.e., one or more amines can be partially or completely dissolved in the IL) before dissolving the biomass in IL or after dissolving the biomass in IL. In embodiments where the amine is added after dissolving the biomass in IL, the dissolved biomass in IL can be cooled to room temperature and amine can be added. In some embodiments, addition of the amine can cause the system to form a semi-solid or gel. The semi-solid or gel can be liquefied by heating at a temperature of from about 40° C. to about 150° C. (e.g., from about 75° C. to about 130° C. or from about 90° C. to about 110° C.) for up to 3 hours or longer.

Carbon dioxide gas ($CO_2$) can then be bubbled into the mixture, which can react with the amine to form an amine carbamate. In some examples, the $CO_2$ addition occurs at elevated temperatures over a period of time. For example, the $CO_2$ can be bubbled into the composition at a temperature of from about 20° C. to about 50° C. (e.g., about 40° C.). The $CO_2$ can be added for up to 24 hours or until precipitation is complete. The amount of $CO_2$ that can be added to the mixture is an amount effective to substantially precipitate the biomass from the composition. This amount can vary depending on the amount of biomass, the type of the biomass, the type of ionic liquid, the type and amount of amine, temperature, and other factors. Thus, it is not possible to state an exact amount of $CO_2$ that is added. Generally, the $CO_2$ can be added continuously until the desired degree of biomass precipitation occurs. So while the amount cannot be stated precisely for every circumstance, it can be readily determined by the skilled artisan. But "substantially precipitate" is meant to precipitate to a degree where at the desired biomass component, e.g., cellulose, chitin, and the like), is precipitated with at least about 50, 60, 70, 80, 90, or 95% yield.

The formed amine carbamate can compete with and impede the hydrogen bonding between the IL anion and the hydroxyl groups of the polysaccharides contained in the biomass (e.g., cellulose or chitin). Thus, the solubility of the polysaccharides in the IL decreases, which in turn causes the polysaccharides to precipitate out from the mixture. In this manner, the ionic liquid/amine systems can be used to separate cellulosic or chitinous materials from the biomass.

In one aspect, tree bark, sawdust, wood chips, wood pulp, or any other crude material comprising wood, can be added to a mixture of an ionic liquid and an amine. Upon phase separation of the mixture, each phase can be separated from the other phase. The resulting composition of each individual phase can be treated in any manner to remove, recover, reconstitute, or store the desired component. Cellulose, for example, if present in one of the separated phases, can be processed according to the methods disclosed in U.S. Pat. No. 6,824,599, which is incorporated by reference herein.

Once the polysaccharides have been precipitated from the mixture, techniques can be further employed to separate the components. For example, the mixture can be filtered using vacuum filtration to separate the solid and liquid phases. For example, the recovering can include separating the precipitated biomass from the composition and heating the composition at a temperature of from about 30° C. to about 150° C. or from about 80° C. to about 120° C.

To recycle the ionic liquid, the solution containing the IL and amine carbamate can be heated to an elevated temperature to decompose the carbamate and evaporate the amine. In some examples, the temperature can be about 60° C. or higher, about 65° C. or higher, about 70° C. or higher, about 75° C. or higher, about 80° C. or higher, about 85° C. or higher, about 90° C. or higher, about 95° C. or higher, about 100° C. or higher, about 105° C. or higher, about 110° C. or higher, about 115° C. or higher, about 120° C. or higher, about 125° C. or higher, about 130° C. or higher, about 135° C. or higher, about 140° C. or higher, about 145° C. or higher, about 150° C. or higher, or the like. The resulting solution can then be dried at elevated temperatures and/or in a vacuum to recover the IL. The recovered IL can then be used for further biomass processing or other uses.

In a further aspect, provided herein are methods of preparing polysaccharide films and fibers from biomass. The methods include contacting a first composition comprising biomass and a first ionic liquid with a second composition comprising a second ionic liquid, and an amine carbamate. In some embodiments, the first ionic liquid and the second ionic liquid are the same. In some embodiments, the first composition is extruded into the second composition at a controlled rate (e.g., with the use of a syringe pump). The formed fibers and films are stable and can maintain their forms for two or more days. The ionic liquids used to prepare the films and fibers can be recycled according to the method described above.

The examples below are intended to further illustrate certain aspects of the methods and compositions described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Materials

1-Ethyl-3-methylimidazolium chloride ([$C_2$mim]Cl) and 1-butyl-3-methylimidazolium chloride ([$C_4$mim]Cl) (purity ≥90%) were obtained from BASF (Ludwigshafen, Germany). 1-Ethyl-3-methylimidazolium acetate ([$C_2$mim]OAc) (purity >95%) was obtained from Iolitec (Tuscaloosa, Ala.) and used without further purification. Monoethanolamine (MEA), diethanolamine (DEA), butylamine (BA), ethylenediamine (EDA), and microcrystalline cellulose (MCC) were purchased from Sigma-Aldrich (St. Louis, Mo.); triethanolamine (TEA) and pentylamine (PA) were obtained from Riedel-De Haën (Seelze, Germany), and used without further purification. Compressed $CO_2$ was purchased from Airgas (Radnor, Pa.). Microcrystalline cellulose (MCC) and practical grade chitin (PG-chitin) were purchased from Sigma (St. Louis, Mo.) and used directly without further purification. Deionized (DI) water was obtained from a commercial deionizer (Culligan; Northbrook, Ill.) with specific resistivity of 17.25 MΩcm at 25° C. Vacuum Oven (Model 285A) was obtained from Fisher Scientific (Waltham, Mass.) with the capability of vacuum of 30 in Hg.

Example 2

Characterization

The amine and formed amine carbamate were characterized by both 1D NMR ($^1$H, $^{13}$C) and 2D NMR (COSY, HSQC, and HMBC). Deuterated water ($D_2O$) was used as the solvent for NMR analysis. The separated solid, liquid, and formed film/fiber were characterized by infrared (IR) spectroscopy.

Example 3

[$C_4$mim]Cl-MCC-TEA-$CO_2$ System

MCC (0.2 g) was stirred with 5 g of [$C_4$mim]Cl (28.6 mmol) at 100° C. for 10 min to obtain a clear solution of 4% MCC. TEA (4.27 g, 28.6 mmol) was added into the above [$C_4$mim]Cl-MCC solution and a clear gel formed upon stirring at room temperature for 2 minutes (see FIG. 1, left panel). The formed gel was liquefied after heating at 90° C. for 3 hours. After that, $CO_2$ was bubbled into the above [$C_4$mim]Cl-MCC-TEA solution at a flow rate of 70 cm$^3$/min at 40° C. for up to 24 hours or until a solid precipitated from the solution (see FIG. 1, right panel). The precipitate was then separated from the solution by means of vacuum filtration. A light yellowish gel was formed on the top of filter paper in the Buchner funnel and the liquid in the separation flask was bright yellowish. The gel was then washed with about 20 mL DI water to form a white solid. The separated solid and liquid were analyzed by IR, which confirmed that the solid was pure MCC and the liquid was a mixture of [$C_4$mim]Cl and TEA.

Example 4

[$C_2$mim]OAc-EDA-MCC-$CO_2$ System

Colorless liquid amine (EDA, BA or PA) (10 g) was placed in a 20-mL glass vial. $CO_2$ was bubbled into the amine solution at a flow rate of 70 cm$^3$/min at 40° C. for 1 hour. For BA and PA, a white solid formed at the end of the hour. For EDA, a slightly yellowish viscous solution formed. EDA, BA, and PA each formed carbamates upon bubbling $CO_2$ at 40° C. for 1 h. The carbamates were analyzed by $^1$H, $^{13}$C NMR, and IR. Both 1D and 2D NMR analyses have been applied to study the structure of the EDA carbamate and confirmed it is a mixture of two products (see FIG. 2). A 1:1 molar ratio mixture of [$C_2$mim]OAc and EDA readily dissolves 4% MCC, thus indicating this approach could be able to operate in a close-loop fashion.

[$C_2$mim]OAc (10 g, 58.7 mmol) and 3.53 g EDA (58.7 mmol) were mixed at room temperature. MCC (0.4 g) was added to the [$C_2$mim]OAc-EDA solution and stirred at 100° C. for 80 minutes until MCC was completely dissolved. After that, $CO_2$ was bubbled into the resulting [$C_2$mim]OAc-EDA-MCC solution at a flow rate of 70 cm$^3$/min at 40° C. for up to 24 hours or until the mixture was solidified. The solid was partially melted upon heating in the oven at 70-80° C. A yellowish solid and bright yellowish liquid were then separated from the solution by means of vacuum filtration according to the method described above. The separated solid and liquid were analyzed by IR, which showed the products correspond to MCC and [$C_2$mim]OAc, respectively (see FIG. 3). The molar ratio between [$C_2$mim]OAc and EDA was adjusted to determine the limit for precipitating the MCC. MCC was precipitated out of the mixture when using ratios of [$C_2$mim]OAc to EDA from 1:1 through 6:1.

Example 5

[$C_2$mim]OAc-Chitin-EDA-$CO_2$ System

Figure 4:
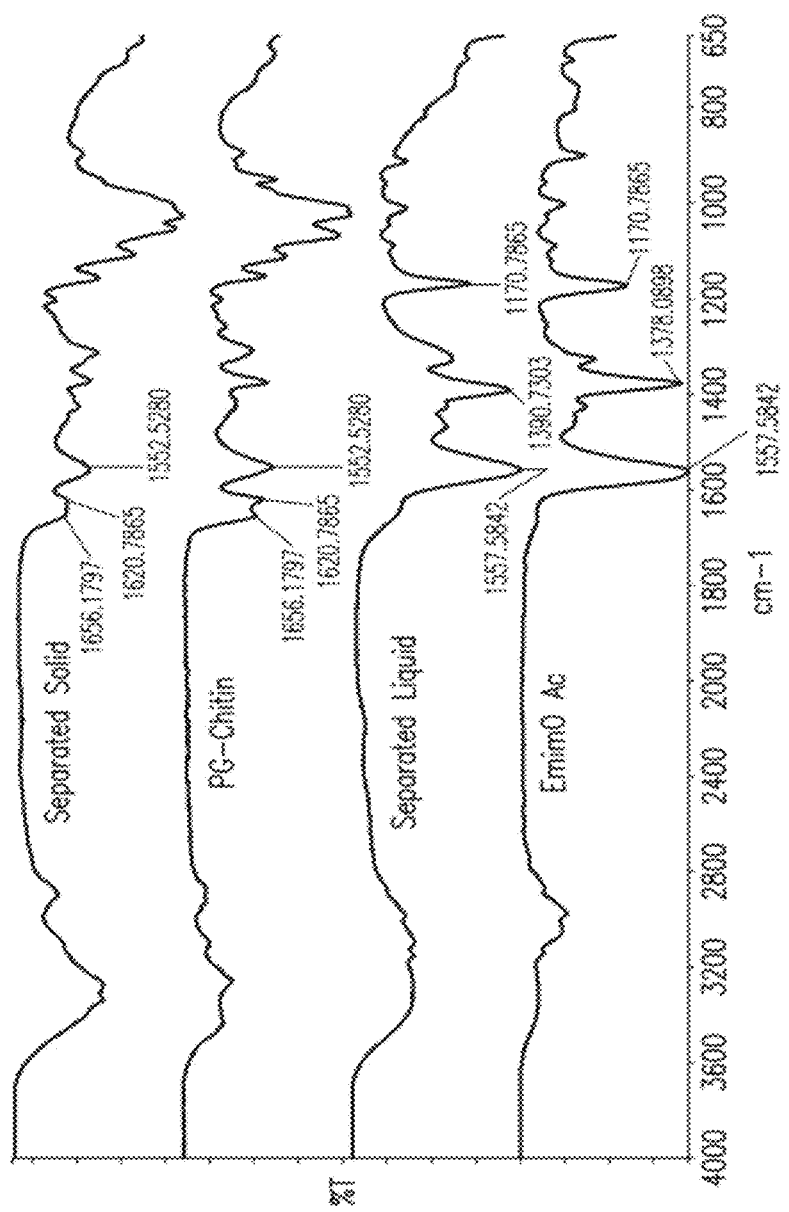
FIG. 4 is the IR spectrum of the separated solid and separated liquid from the [C$_2$mim]OAc-chitin-EDA-CO$_2$ system. Unreacted PG-chitin and [C$_2$mim]OAc served as controls.
Figure 5A:
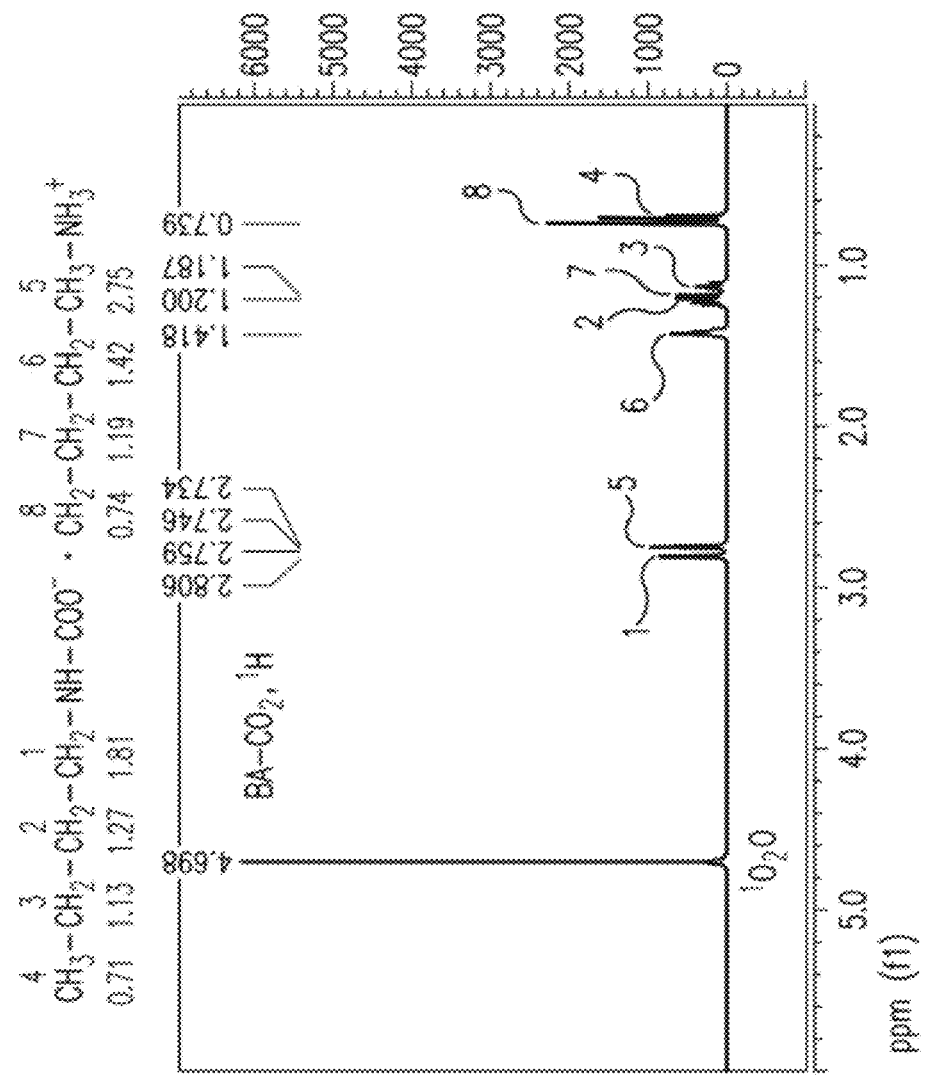
FIG. 5 is the NMR spectra for the product from the BA-CO$_2$ reaction. The top left and right panels are the $^1$H NMR and $^{13}$C NMR spectra, respectively, for the reaction product. The bottom left and right panels are the $^1$H NMR and $^{13}$C NMR spectra, respectively, for the unreacted BA control.
Figure 5B:
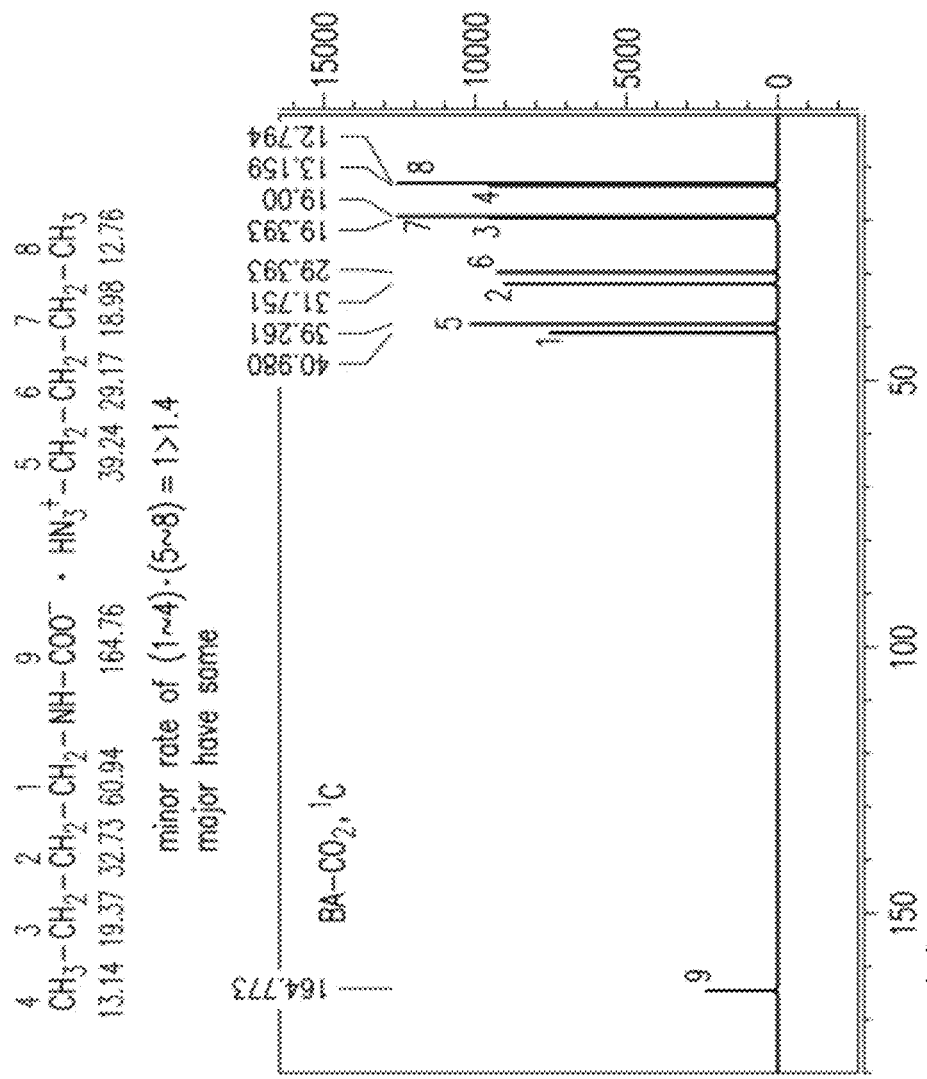
Figure 5C:
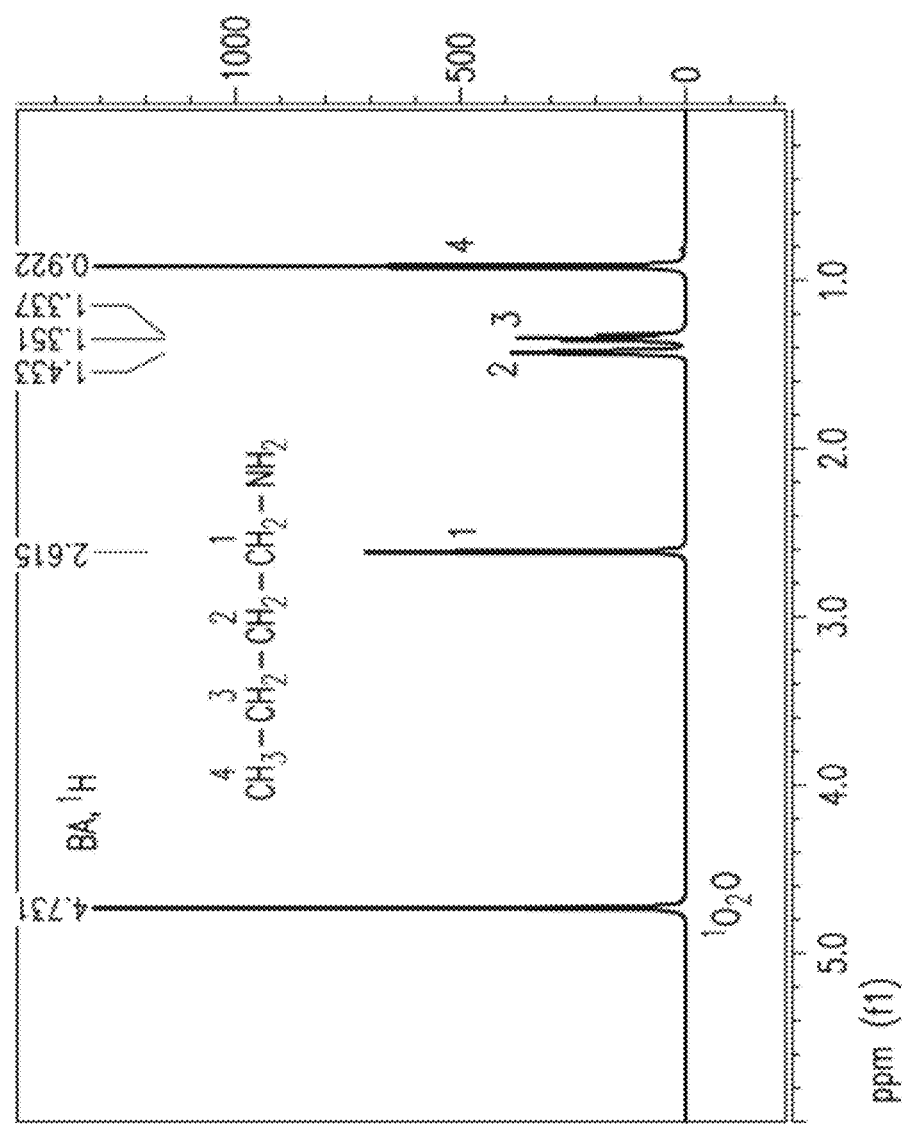
Figure 5D:
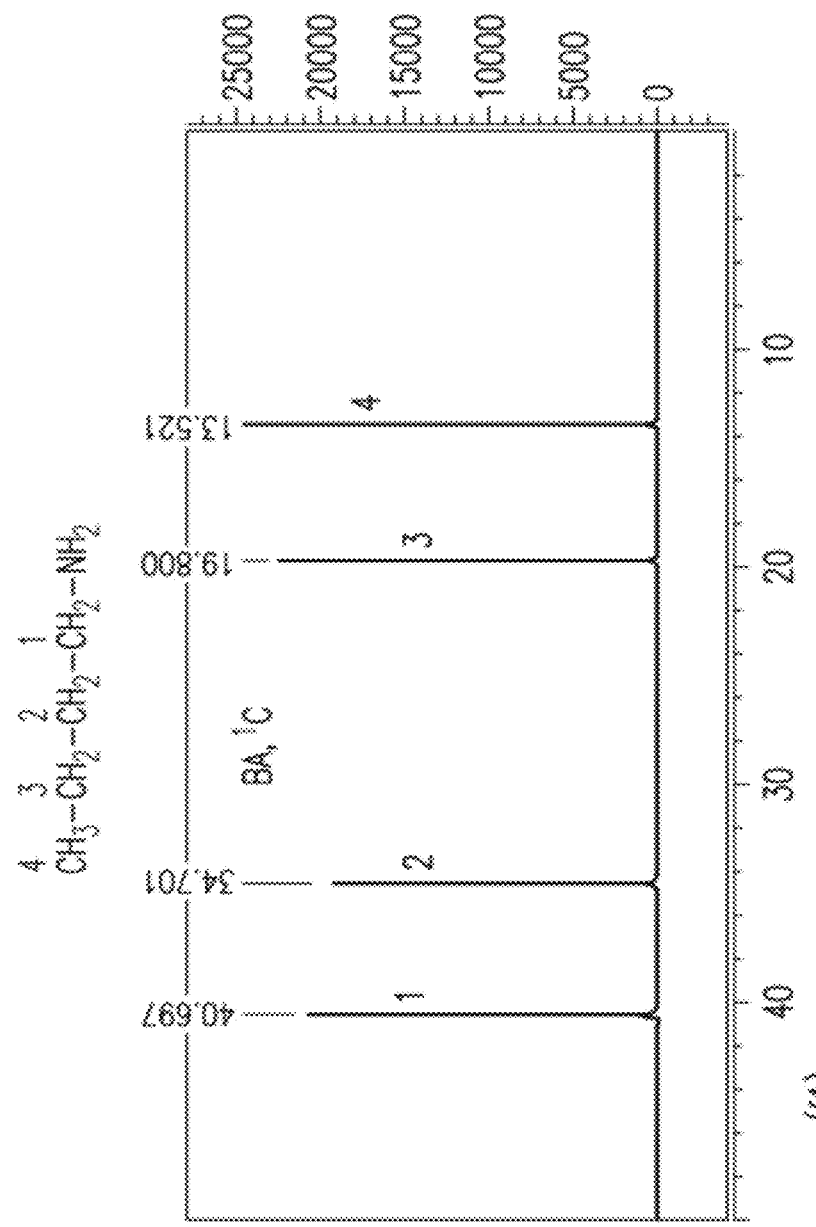

PG-chitin (0.05 g) was stirred with 5 g of [$C_2$mim]OAc (29.4 mmol) at 130° C. for 30 minutes to obtain a clear solution with 1% of PG-chitin. EDA (1.77 g, 29.4 mmol) was added to the [$C_2$mim]OAc-chitin solution and stirred at room temperature for 2 minutes. After that, $CO_2$ was bubbled into the resulting [$C_2$mim]OAc-Chitin-EDA mixture at a flow rate of 70 cm$^3$/min at 40° C. for up to 24 h or until precipitate completely formed in the solution. The precipitate was then separated from the solution by means of vacuum filtration. A yellowish solid and bright yellowish liquid were then separated from the solution by means of vacuum filtration according to the method described above. The separated solid and liquid were analyzed by IR, which showed the products as pure PG-chitin and [C$_2$mim]OAc, respectively (see FIG. 4).

Example 6

[C$_2$mim]OAc-MCC-Simple Amine-CO$_2$ System

Simple amines with lower boiling points, including BA (b.p. 78° C.) and PA (b.p. 104° C.) were explored to reduce the mixture viscosity and facilitate processing.

Both BA and PA were reacted with CO$_2$ at 40° C. to form carbamates. The reactions were completed after an hour. Both 1D NMR (FIG. 5) and 2D NMR analyses were used to study the structure of the BA-CO$_2$ product. These analyses confirmed the product was a pure carbamate salt, formed according to the reaction scheme shown below.

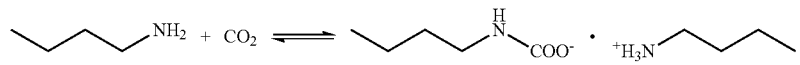

Figure 6A:
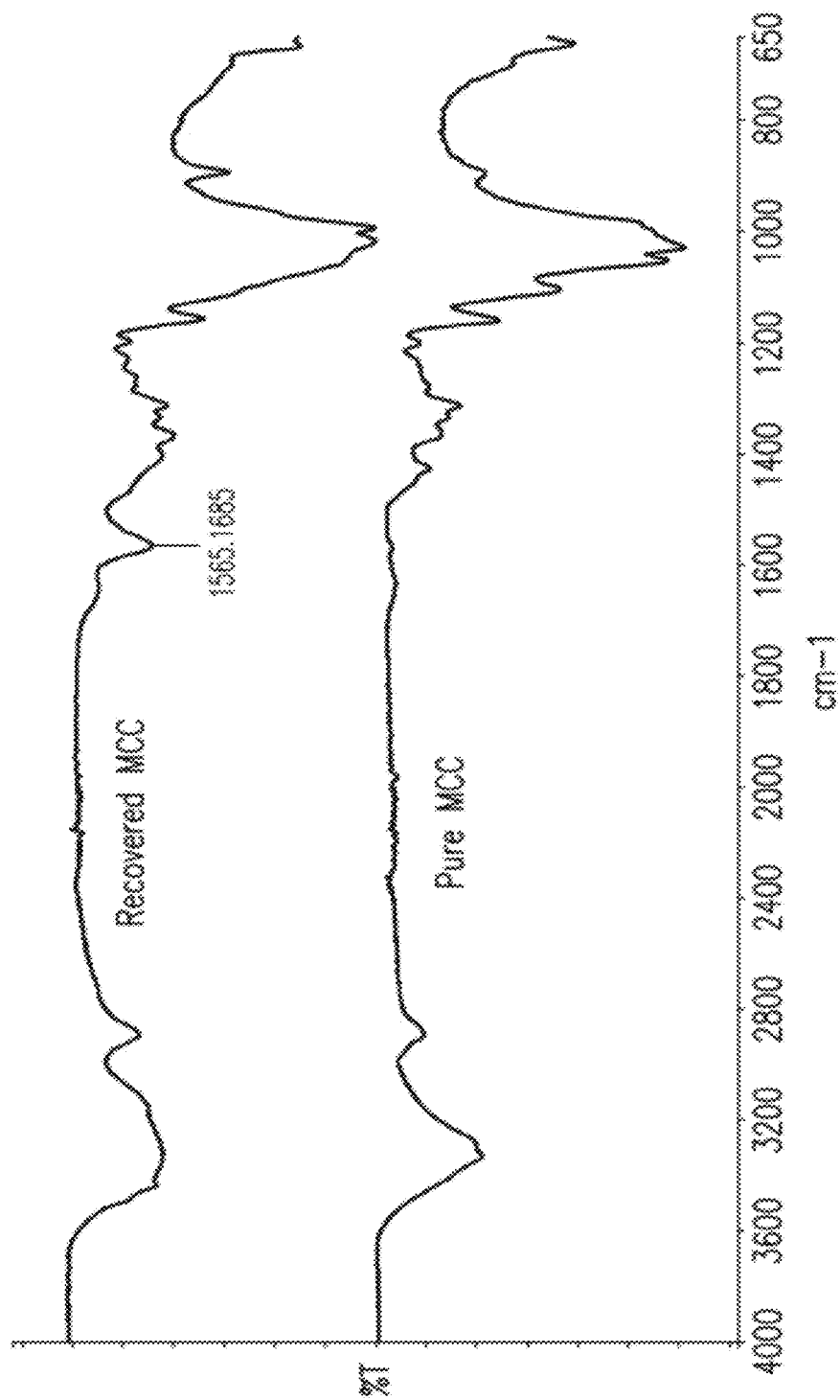
FIG. 6 is the IR spectra of the precipitated solid (left panel) and the separated liquid (right panel) from the [C$_2$mim]OAc-BA-MCC-CO$_2$ system. Unreacted MCC, [C$_2$mim]OAc, and BA served as controls.
Figure 6B:
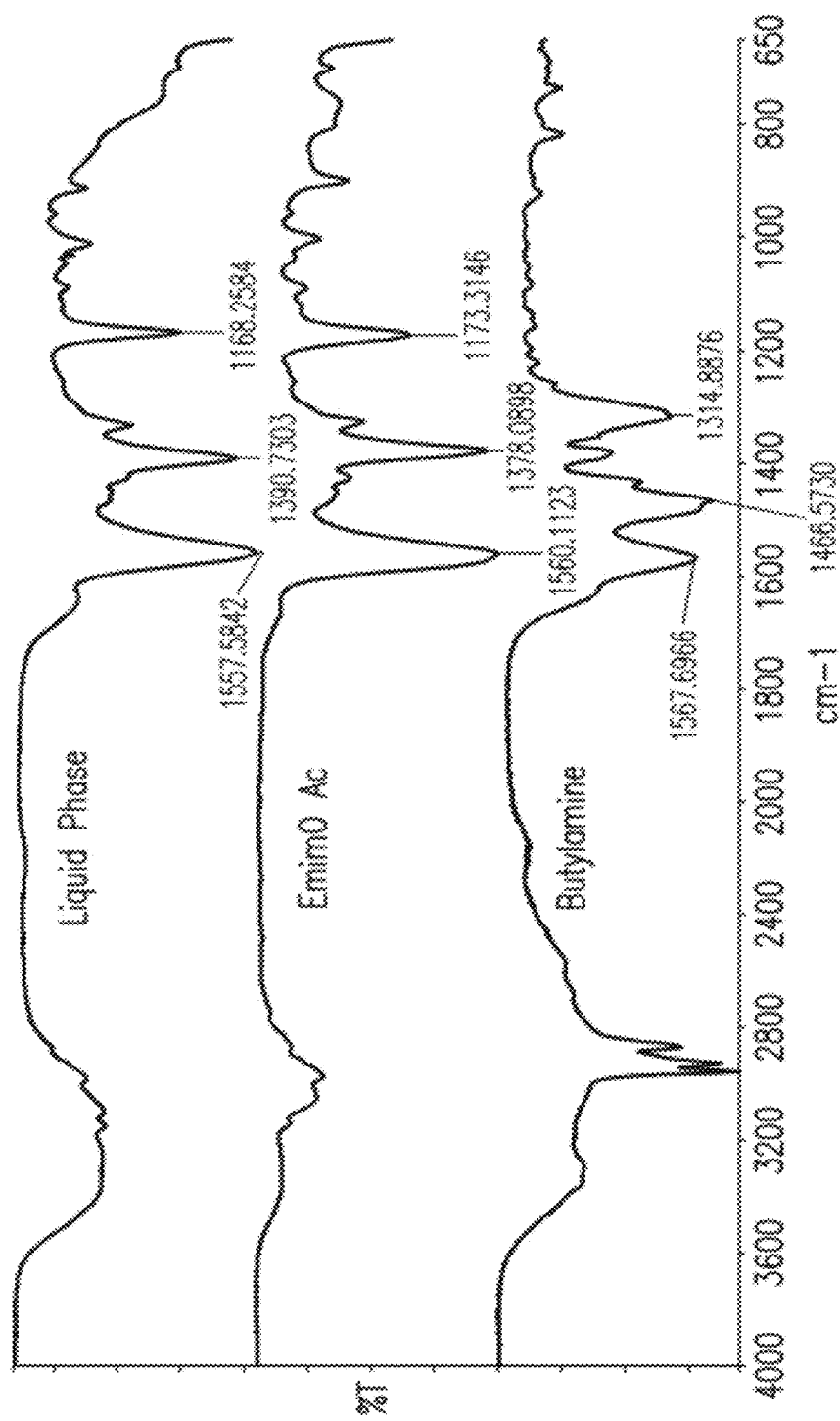

Due to the successful formation of carbamate from BA or PA, the possibility of reducing the solubility of biomass in [C$_2$mim]OAc upon introducing BA carbamate into the system was tested. Specifically, MCC (0.1 g) was stirred with 5 g of [C$_2$mim]OAc (29.4 mmol) at 100° C. for 10 minutes to obtain a clear solution of 2% MCC. A simple amine (29.4 mmol; 2.15 g BA or 2.56 g PA) was added to the above [C$_2$mim]OAc-MCC solution and stirred at room temperature for 2 minutes. After that, CO$_2$ was bubbled into the resulting [C$_2$mim]OAc-MCC-simple amine mixture at a flow rate of 70 cm$^3$/min at 40° C. for up to 24 hours or until precipitate completely formed in the solution. The precipitate was then separated from the solution by means of vacuum filtration. A yellowish solid and bright yellowish liquid were then separated from the solution by means of vacuum filtration according to the method described above. The separated solid and liquid were analyzed by IR, which showed the solid to be MCC and the liquid to be [C$_2$mim]OAc (see FIG. 6).

Example 7

MCC Fiber/Film Produced from [C$_2$mim]OAc-MCC-BA-CO$_2$ System

Figure 7:
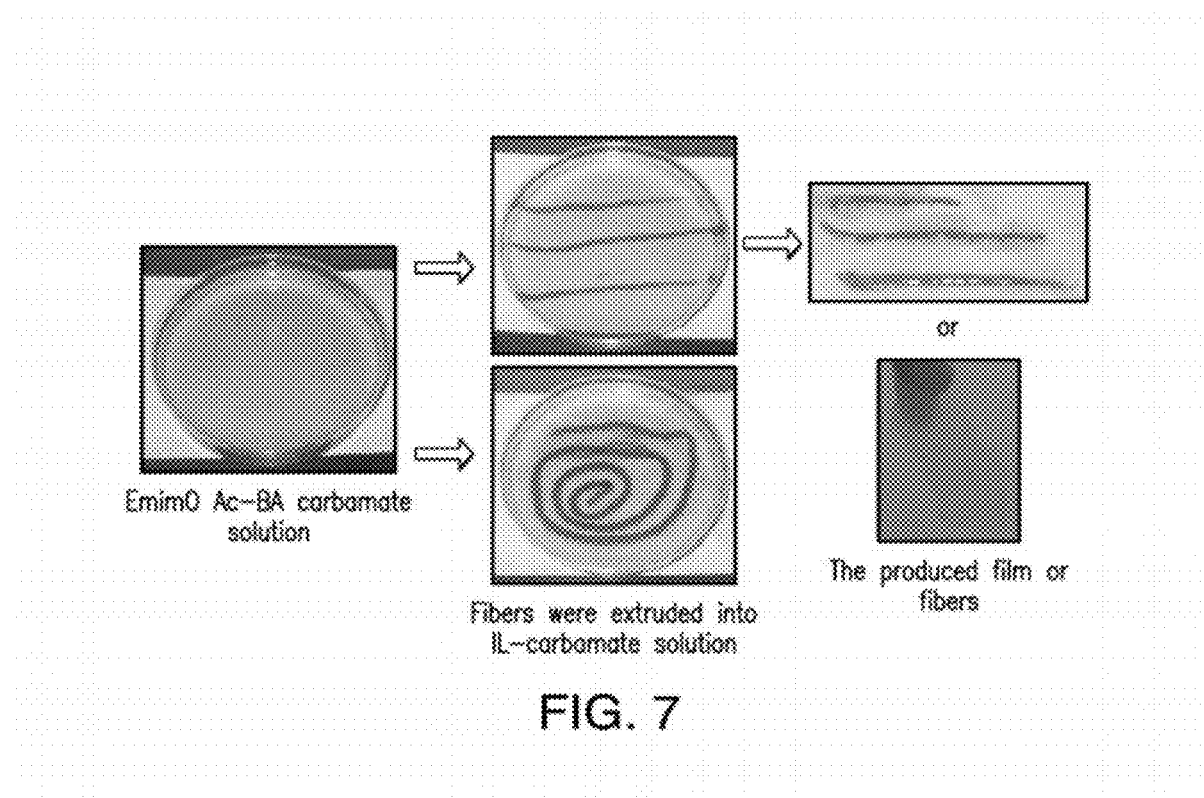
FIG. 7 is a series of photographs showing the films and fibers produced from the [C$_2$mim]OAc-MCC-BA carbamate system.

Since [C$_2$mim]OAc is a suitable, reusable solvent for cellulose/chitin film/fiber processing, a technique to produce MCC fiber or film was developed. MCC (0.9 g) was stirred with 5 g of [C$_2$mim]OAc at 100° C. for 10 minutes to obtain a clear solution containing 18% of MCC (Solution A; [C$_2$mim]OAc-18% MCC). Approximately 17 g BA carbamate was dissolved in 15 g of [C$_2$mim]OAc upon stirring at room temperature for up to 24 hours to form a clear solution B ([C$_2$mim]OAc-BA carbamate). Solution A was carefully loaded into a 10-mL syringe which was then mounted onto a syringe pump (Model No. NE-1010, New Era Pump Systems, Inc, Farmingdale, N.Y.). Solution A was extruded into a plastic petri dish (8.5 cm diameter and 1.2 tall) containing solution B at a rate of 1 mm/min to form fibers. The fibers in the [C$_2$mim]OAc-BA carbamate bath did not dissociate, but maintained their form for up to two days (see FIG. 7). The produced fibers were soaked in solution B for 5-24 hours and then soaked in 50 mL DI water for a day to remove the residual IL. The fibers were then air dried. For the solution A with lower MCC concentrations (12-16%), the extruded solution A did not form fiber in B, but instead formed a piece of film at the bottom of Petri dish. The film was processed according to the methods for processing the fiber as aforementioned.

After preparing the fiber, the [C$_2$mim]OAc-BA carbamate solution was stirred at 100° C. for 1 hour to decompose the carbamate and evaporate BA. The pre-dried [C$_2$mim]OAc was then combined together. The solution was further dried in a vacuum oven at 80° C. and −30 in Hg vacuum for 3 hours until no bubbles were observed.

The IL was recovered by heating the [C$_2$mim]OAc-BA carbamate at 100° C. to decompose the carbamate and release the amine. The DI water washing was heated in an oil bath at 110° C. for 1 to 4 hours to evaporate most of the contained water. The moisture was removed by vacuum oven heating at 80° C. and −30 in Hg vacuum for 3 hours. It is found that up to 96.5% of loaded [C$_2$mim]OAc and 99.9% loaded MCC were recovered at the end of this cycle. The IL recovery was calculated based on the weight of recovered IL over weight of initially loaded IL.

The reusability of the recovered IL was studied by using the recycled [C$_2$mim]OAc from the first cycle to dissolve MCC and BA carbamate and then making fiber using the same procedure as aforementioned. At the end of the second cycle, up to 84.7% of [C$_2$mim]OAc and 91.4% of MCC were recovered. The recovered [C$_2$mim]OAc, analyzed by IR, was high in purity.

The compounds and methods of the appended claims are not limited in scope by the specific compounds and methods described herein, which are intended as illustrations of a few aspects of the claims and any compounds and methods that are functionally equivalent are within the scope of this disclosure. Various modifications of the compounds and methods in addition to those shown and described herein are intended to fall within the scope of the appended claims. Further, while only certain representative compounds, methods, and aspects of these compounds and methods are specifically described, other compounds and methods and combinations of various features of the compounds and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method of precipitating a biomass, comprising:
    a. providing a composition comprising a biomass, an ionic liquid, and an amine, wherein the composition is substantially free from water; and
    b. contacting the composition with carbon dioxide in an amount effective to react with the amine to form an amine carbamate effective to substantially precipitate the biomass from the composition, thereby forming a precipitated biomass.

2. The method of claim 1, wherein the biomass is a lignocellulosic biomass.

3. The method of claim 1, wherein the biomass is derived from softwood, hardwood, or a combination thereof.

4. The method of claim 1, wherein the biomass is a crustacean biomass.

5. The method of claim 1, wherein providing the composition comprises dissolving the biomass in the ionic liquid at a temperature of from about 0° C. to about 250° C.

6. The method of claim 1, wherein providing the composition comprises dissolving the biomass in the ionic liquid and the amine at a temperature of from about 0° C. to about 250° C.

7. The method of claim 1, wherein contacting the composition comprises bubbling the carbon dioxide into the composition at a temperature of from about 20° C. to about 50° C.

8. The method of claim 1, further comprising separating at least a portion of cellulose or chitin from the composition.

9. The method of claim 1, further comprising recovering at least a portion of the ionic liquid from the composition.

10. The method of claim 9, wherein the recovering comprises separating the precipitated biomass from the composition and heating the composition at a temperature of from about 30° C. to about 150° C.

11. The method of claim 1, wherein the ionic liquid comprises one or more cations and one or more anions and wherein the cations comprise one or more compounds having the formula:

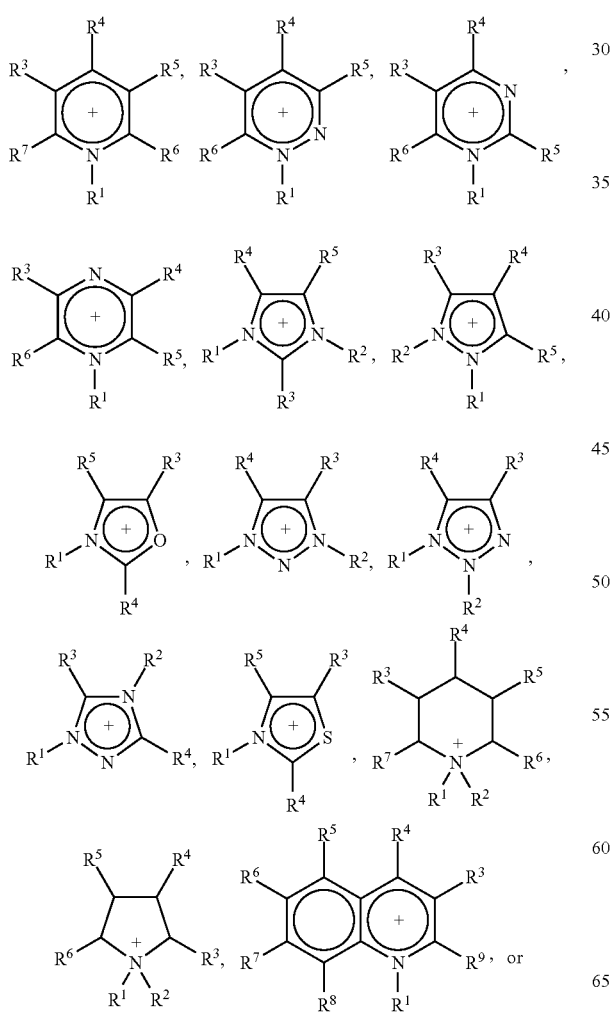

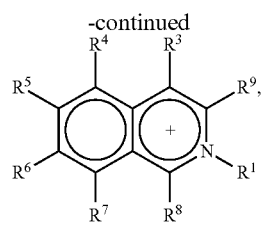

wherein $R^1$ and $R^2$ are independently a $C_1$-$C_6$ alkyl group or a $C_2$-$C_6$ alkoxyalkyl group, and $R^3$, $R^4$, $R^5$, $R^6$, $R^7$, $R^8$, and $R^9$ are independently H, a $C_1$-$C_6$ alkyl, a $C_2$-$C_6$ alkoxyalkyl group, or a $C_1$-$C_6$ alkoxy group, and the anions comprise $F^-$, $Cl^-$, $Br^-$, $I^-$, $ClO_4^-$, $AsF_6^-$, $SbF_6^-$, $NO_2^-$, $NO_3^-$, $SO_4^{2-}$, $PO_4^{3-}$, $HPO_4^{2-}$, $CF_3CO_2^-$, $CO_3^{2-}$, or $C_1$-$C_6$ carboxylate.

12. The method of claim 1, wherein the ionic liquid comprises one or more cations and one or more anions and wherein the one or more cations comprise one or more compounds having the formula:

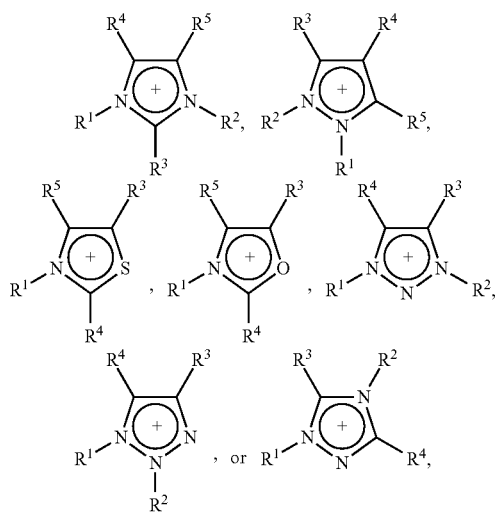

wherein $R^1$ and $R^2$ are independently a $C_1$-$C_6$ alkyl group or a $C_2$-$C_6$ alkoxyalkyl group, and $R^3$, $R^4$, and $R^5$ are independently H, a $C_1$-$C_6$ alkyl group, a $C_2$-$C_6$ alkoxyalkyl group, or a $C_1$-$C_6$ alkoxy group, and the anions comprise one or more of $F^-$, $Cl^-$, $Br^-$, $I^-$, $ClO_4^-$, $AsF_6^-$, $SbF_6^-$, $NO_2^-$, $NO_3^-$, $SO_4^{2-}$, $PO_4^{3-}$, $HPO_4^{2-}$, $CF_3CO_2^-$, $CO_3^{2-}$, or $C_1$-$C_6$ carboxylate.

13. The method of claim 12, wherein the one or more cations comprise an imidazolium ion having the formula:

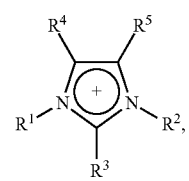

wherein $R^1$ and $R^2$ are $C_1$-$C_6$ alkyl.

14. The method of claim 1, wherein the ionic liquid comprises 1-($C_1$-$C_6$ alkyl)-3-methyl-imidazolium halide or 1-($C_1$-$C_6$ alkyl)-3-methyl-imidazolium acetate.

15. The method of claim 1, wherein the amine is selected from the group consisting of primary amines, secondary amines, tertiary amines, cyclic amines, or mixtures thereof.

16. The method of claim 1, wherein the amine is an alkanolamine.

17. The method of claim 1, wherein the amine is selected from the group consisting of ethylenediamine, butylamine, pentylamine, or mixtures thereof.

18. The method of claim 1, wherein the amine is a monoamine, a diamine, or a polyamine.

19. The method of claim 1, wherein the ionic liquid and the amine are present in a ratio from 9:1 to 1:9.

20. A composition, comprising: biomass; an ionic liquid; an amine; $CO_2$; and an amine carbamate; wherein the composition is substantially free from water.

21. The composition of claim 20, wherein the biomass is a lignocellulosic biomass.

22. The composition of claim 20, wherein the biomass is derived from softwood, hardwood, or a combination thereof.

23. The composition of claim 20, wherein the biomass is a crustacean biomass.

24. The composition of claim 20, wherein the ionic liquid comprises one or more cations and one or more anions and wherein the cations comprise one or more compounds having the formula:

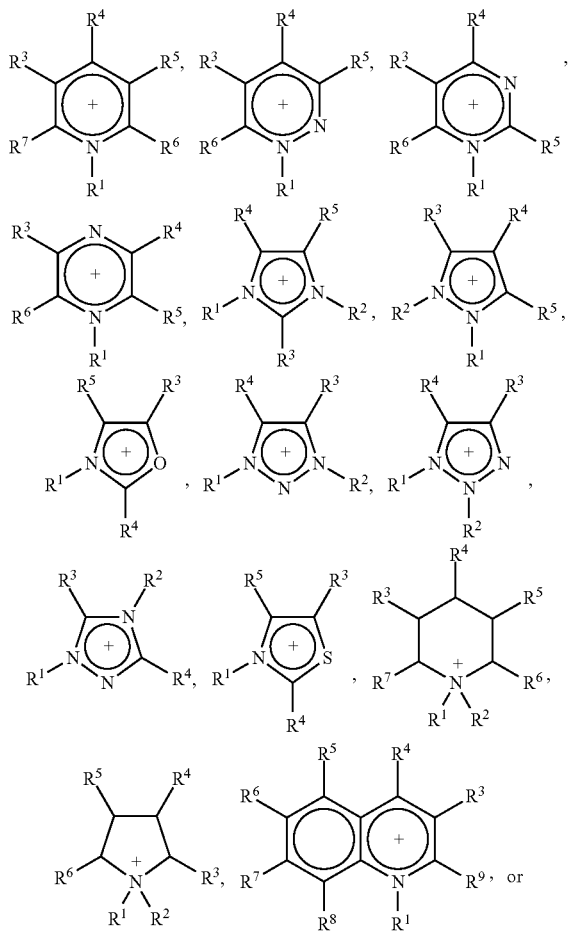

-continued

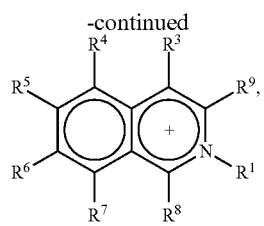

wherein $R^1$ and $R^2$ are independently a $C_1$-$C_6$ alkyl group or a $C_2$-$C_6$ alkoxyalkyl group, and $R^3$, $R^4$, $R^5$, $R^6$, $R^7$, $R^8$, and $R^9$ are independently H, a $C_1$-$C_6$ alkyl, a $C_2$-$C_6$ alkoxyalkyl group, or a $C_1$-$C_6$ alkoxy group, and the anions comprise $F^-$, $Cl^-$, $Br^-$, $I^-$, $ClO_4^-$, $AsF_6^-$, $SbF_6^-$, $NO_2^-$, $NO_3^-$, $SO_4^{2-}$, $PO_4^{3-}$, $HPO_4^{2-}$, $CF_3CO_2^-$, $CO_3^{2-}$, or $C_1$-$C_6$ carboxylate.

25. The composition of claim 20, wherein the ionic liquid comprises one or more cations and one or more anions and wherein the one or more cations comprise one or more compounds having the formula:

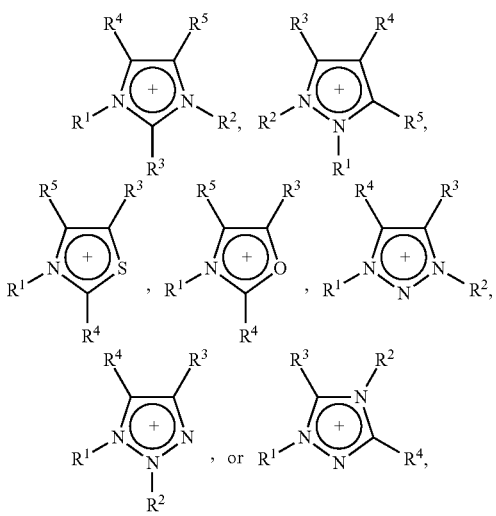

wherein $R^1$ and $R^2$ are independently a $C_1$-$C_6$ alkyl group or a $C_2$-$C_6$ alkoxyalkyl group, and $R^3$, $R^4$, and $R^5$ are independently H, a $C_1$-$C_6$ alkyl group, a $C_2$-$C_6$ alkoxyalkyl group, or a $C_1$-$C_6$ alkoxy group, and the anions comprise one or more of $F^-$, $Cl^-$, $Br^-$, $I^-$, $ClO_4^-$, $AsF_6^-$, $SbF_6^-$, $NO_2^-$, $NO_3^-$, $SO_4^{2-}$, $PO_4^{3-}$, $HPO_4^{2-}$, $CF_3CO_2^-$, $CO_3^{2-}$, or $C_1$-$C_6$ carboxylate.

26. The composition of claim 25, wherein the one or more cations comprise an imidazolium ion having the formula:

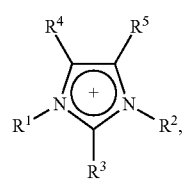

wherein $R^1$ and $R^2$ are $C_1$-$C_6$ alkyl.

27. The composition of claim 20, wherein the ionic liquid comprises 1-($C_1$-$C_6$ alkyl)-3-methyl-imidazolium halide or 1-($C_1$-$C_6$ alkyl)-3-methyl-imidazolium acetate.

28. The composition of claim 20, wherein the amine is selected from the group consisting of primary amines, secondary amines, tertiary amines, cyclic amines, or mixtures thereof.

29. The composition of claim 20, wherein the amine is an alkanolamine.

30. The composition of claim 20, wherein the amine is selected from the group consisting of ethylenediamine, butylamine, pentylamine, or mixtures thereof.

31. The composition of claim 20, wherein the amine is a monoamine, a diamine, or a polyamine.

* * * * *